(12) United States Patent
Lim et al.

(10) Patent No.: US 12,547,516 B2
(45) Date of Patent: Feb. 10, 2026

(54) SYSTEMS AND METHODS FOR DYNAMICALLY CONFIGURING A CLIENT APPLICATION

(71) Applicant: Bitdrift, Inc., San Francisco, CA (US)

(72) Inventors: Brendan Gonzales Lim, San Jose, CA (US); Taggart C. Matthiesen, Kentfield, CA (US); Vicky Li, San Francisco, CA (US); Martin Conte Mac Donell, San Jose, CA (US); Matthew David Klein, Boise, ID (US)

(73) Assignee: Bitdrift, Inc., San Francisco, CA (US)

( * ) Notice: Subject to any disclaimer, the term of this patent is extended or adjusted under 35 U.S.C. 154(b) by 0 days.

(21) Appl. No.: 17/977,921

(22) Filed: Oct. 31, 2022

(65) Prior Publication Data

US 2024/0143473 A1 May 2, 2024

(51) Int. Cl.
G06F 11/30 (2006.01)
G06F 11/07 (2006.01)

(52) U.S. Cl.
CPC ...... G06F 11/3079 (2013.01); G06F 11/0775 (2013.01)

(58) Field of Classification Search
CPC .................. G06F 11/3079; G06F 11/0775
USPC ........................................................ 717/120
See application file for complete search history.

(56) References Cited

U.S. PATENT DOCUMENTS

| | | | |
|---|---|---|---|
| 8,291,399 B2* | 10/2012 | Li | G06F 11/3644 717/130 |
| 8,739,145 B2* | 5/2014 | Li | G06F 11/3676 717/133 |
| 8,752,007 B2* | 6/2014 | Li | G06F 11/3624 717/130 |
| 9,535,780 B2* | 1/2017 | Rajamanickam | G06F 11/0787 |
| 9,792,144 B2* | 10/2017 | Hassine | G06F 9/45558 |
| 9,916,442 B2* | 3/2018 | Lindo | G06F 21/552 |

(Continued)

FOREIGN PATENT DOCUMENTS

CN 113497723 A 10/2021

OTHER PUBLICATIONS

Zheng, Xi, et al. "Efficient and scalable runtime monitoring for cyber-physical system." IEEE Systems Journal 12.2 (2016): 1667-1678. (Year: 2016).*

(Continued)

Primary Examiner — Matthew J Brophy
(74) Attorney, Agent, or Firm — Lee Sullivan Shea & Smith LLP

(57) ABSTRACT

A client device installed with a client application comprising a configurable rules engine may be configured to (i) receive configuration data for a given rule related to the client application's observability behavior that comprises (a) a trigger event and (b) a set of one or more actions, (ii) based on the received configuration data, configure the configurable rules engine of the client application to execute the given rule, and (iii) initiate a runtime session of the client application during which the configurable rules engine of the client application executes the given rule by (a) monitoring for the trigger event, (b) while monitoring for the trigger event, detecting an occurrence of the trigger event, and (c) based on detecting the occurrence of the trigger event, causing the set of one or more actions to be carried out.

23 Claims, 10 Drawing Sheets

(56) References Cited

U.S. PATENT DOCUMENTS

| | | | | |
|---|---|---|---|---|
| 10,146,529 | B2* | 12/2018 | Fabrizi | G06F 8/71 |
| 10,469,346 | B2* | 11/2019 | Maroulis | G06F 11/3433 |
| 10,558,541 | B1* | 2/2020 | Chakkassery Vidyadharan | G06F 11/3006 |
| 10,776,134 | B2* | 9/2020 | Matei | G06F 9/542 |
| 10,783,116 | B2* | 9/2020 | Wong | G06F 16/164 |
| 11,086,759 | B2* | 8/2021 | Sher | G06F 11/3644 |
| 11,126,523 | B1* | 9/2021 | Chakkassery Vidyadharan | G06F 11/327 |
| 11,646,953 | B2* | 5/2023 | Maroulis | H04L 43/065 709/203 |
| 11,700,192 | B2* | 7/2023 | Mackie | H04L 43/16 709/224 |
| 11,741,186 | B1* | 8/2023 | Frikha | G06N 3/0442 715/234 |
| 12,067,393 | B2* | 8/2024 | Khan | G06F 11/3466 |
| 12,321,250 | B1* | 6/2025 | Dalgaard | G06F 11/3006 |
| 2005/0251791 | A1* | 11/2005 | Hundt | G06F 11/3644 717/130 |
| 2007/0074175 | A1* | 3/2007 | Bengtsson | G06F 11/3688 717/124 |
| 2012/0167057 | A1* | 6/2012 | Schmich | G06F 11/3644 717/130 |
| 2013/0227352 | A1* | 8/2013 | Kumarasamy | G06F 11/3006 714/47.1 |
| 2013/0283102 | A1* | 10/2013 | Krajec | G06F 11/3636 714/38.1 |
| 2015/0143182 | A1* | 5/2015 | Rajamanickam | G06F 11/0781 714/48 |
| 2016/0226731 | A1* | 8/2016 | Maroulis | H04L 69/40 |
| 2017/0371648 | A1* | 12/2017 | Fabrizi | G06F 11/3093 |
| 2019/0026129 | A1* | 1/2019 | Matei | G06F 9/5016 |
| 2019/0102543 | A1* | 4/2019 | Lew | G06F 9/545 |
| 2019/0324873 | A1* | 10/2019 | Patel | G06F 11/3055 |
| 2019/0372868 | A1* | 12/2019 | Maroulis | H04W 4/025 |
| 2020/0409780 | A1* | 12/2020 | Balasubramanian | G06F 9/3838 |
| 2021/0072972 | A1* | 3/2021 | Aabye | G06F 8/71 |
| 2021/0218827 | A1* | 7/2021 | Mc Keown | H04L 67/10 |
| 2021/0271590 | A1* | 9/2021 | Yu | H04L 67/564 |
| 2022/0094598 | A1* | 3/2022 | Wilson | H04L 41/0816 |
| 2022/0147542 | A1* | 5/2022 | Asgar | G06F 11/323 |
| 2022/0217149 | A1* | 7/2022 | Spurlock | G06F 21/10 |
| 2023/0251953 | A1* | 8/2023 | Joshi | G06F 11/302 714/38.1 |
| 2024/0106846 | A1* | 3/2024 | Kapoor | H04L 63/10 |

OTHER PUBLICATIONS

International Searching Authority. International Search Report and Written Opinion issued in International Application No. PCT/US2023/036500, mailed on Feb. 23, 2024, 7 pages.

Kuć, Rafal. Understanding Logging Levels: What They Are & How to Use Them. Sematext Group [online], [retrieved Jul. 6, 2022], Retrieved from the Internet:<URL:https://sematext.com/blog/logging-levels/>, 6 pages.

* cited by examiner

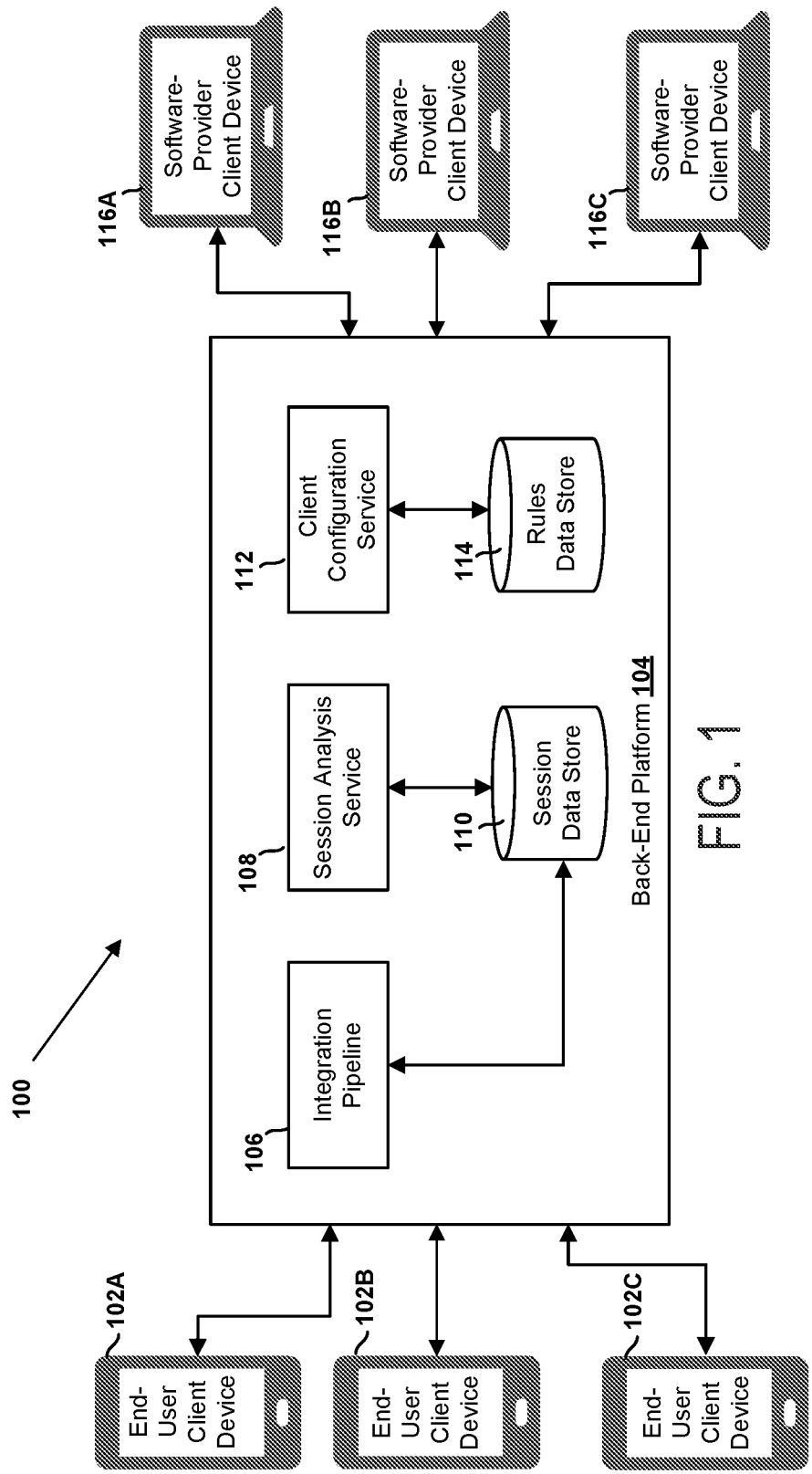

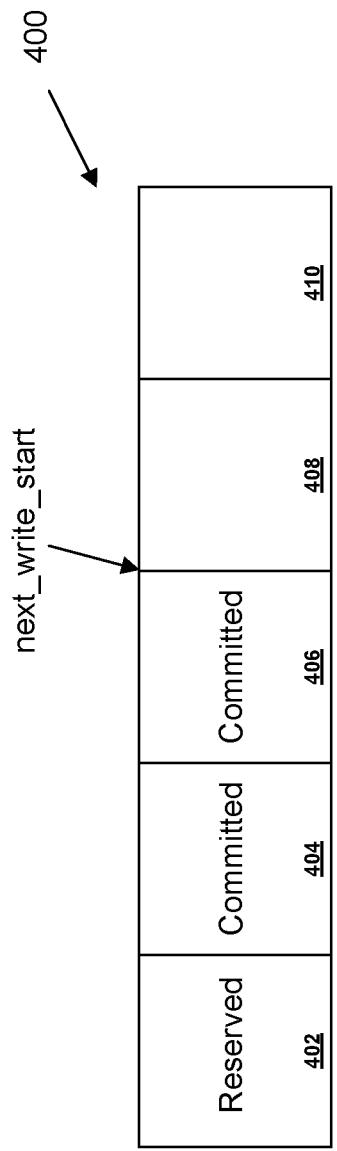
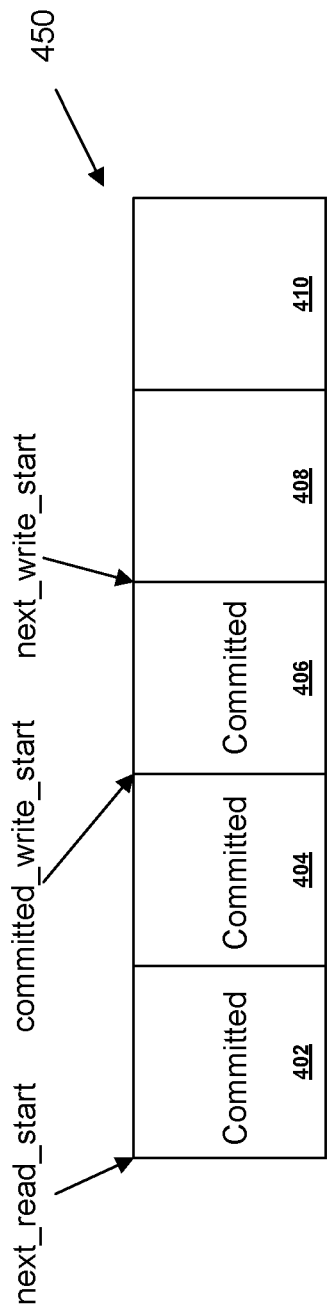
FIG. 4A
FIG. 4B

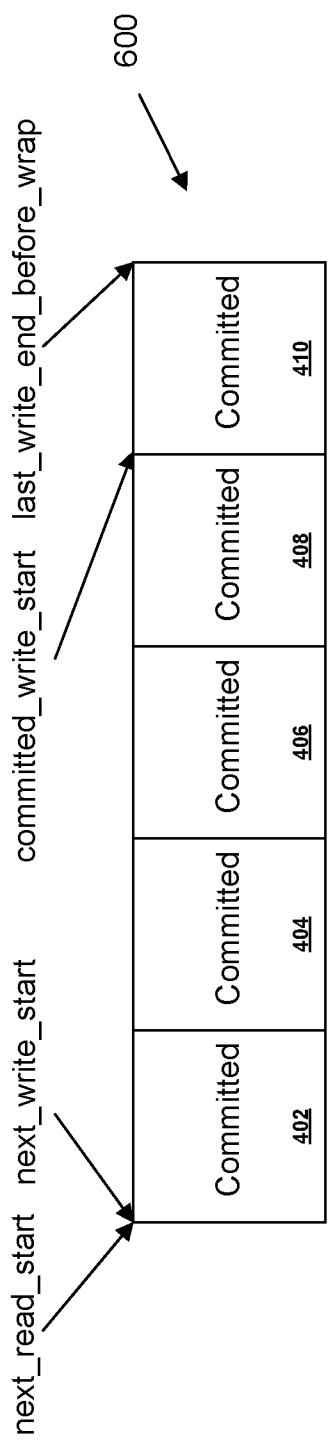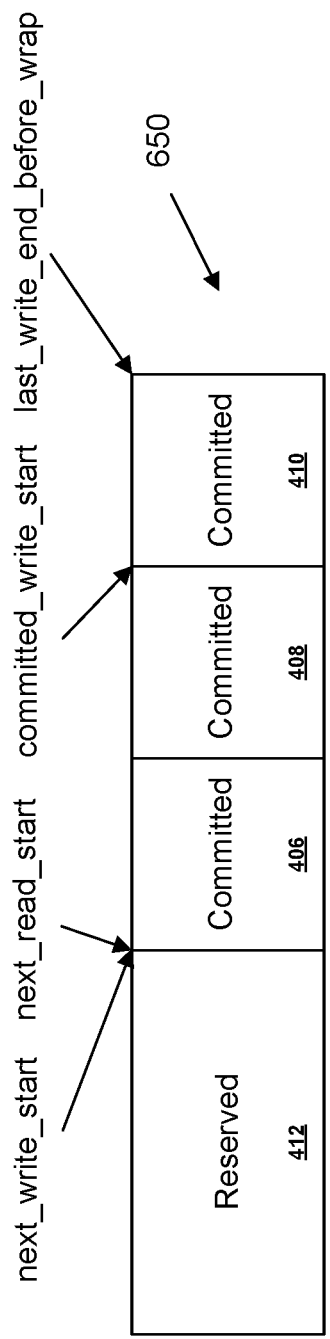

SYSTEMS AND METHODS FOR DYNAMICALLY CONFIGURING A CLIENT APPLICATION

BACKGROUND

In today's digital age, client applications of all different kinds play an increasing role in peoples' daily lives. For example, users of mobile devices such as smartphones and tablets may use a wide range of different mobile applications (or "mobile apps" for short), examples of which may include lifestyle apps (e.g., ridesharing apps, travel apps, restaurant apps, dating apps, etc.), social media apps, entertainment apps (e.g., music apps, video apps, book apps, etc.), gaming apps, news apps, and/or productivity apps, among many other possible examples. As another example, users of other types of computers such as laptops and desktops may use a wide range of different desktop applications, which may fall into similar categories. As yet another example, users of mobile devices and computers may use a wide range of web applications that run within web browsers on the users' mobile devices and computers. The types of client applications that could be installed and used on mobile devices and/or other computers may take various other forms as well.

In order to release a new client application (or a new version of a client application) to users of mobile devices or other computers, a software provider typically has to engage in a multi-stage process that involves activities such as planning the client application, designing, developing, and building the client application, testing the client application, preparing the client application for release, and then releasing the client application, among other possible activities, which can be time consuming and costly. Moreover, after the software provider releases a client application, issues with the client application often materialize that may give rise to a need for the software provider's personnel to review and evaluate the operation of the released client application in order to determine whether an updated version of the client should be developed and released.

SUMMARY

In one aspect, the disclosed technology may take the form of a method implemented by a client device installed with a client application comprising a configurable rules engine, where the method involves (i) receiving, from a back-end platform associated with a provider of the client application, configuration data for a given rule related to observability behavior of the client application, wherein the given rule comprises (a) a trigger event that is to cause a change in the observability behavior of the client application and (b) a set of one or more actions related to the observability behavior of the client application that is to be carried out when the trigger event is detected, (ii) based on the received configuration data, configuring a configurable rules engine of the client application to execute the given rule related to observability behavior of the client application, and (iii) initiating a runtime session of the client application, wherein, during the runtime session, the configurable rules engine of the client application executes the given rule by: (a) monitoring for the trigger event, (b) while monitoring for the trigger event, detecting an occurrence of the trigger event, and (c) based on detecting the occurrence of the trigger event, causing the set of one or more actions to be carried out.

In some example embodiments, the given rule may be defined based on user input from a user associated with the provider of the client application.

Further, the trigger event of the given rule may take various forms, and in some example embodiments, the trigger event of the given rule may comprise one of (i) recordation of a log event that satisfies a specified condition during the runtime session, (ii) detection of a specified change in a state or operation of the client application during the runtime session, (iii) detection of a specified change in a state or operation of the client device during the runtime session, or (iv) receipt of a specified type of user input from an end user of the client application during the runtime session.

Further yet, the function of causing the set of one or more actions to be carried out may take various forms. For instance, in some example embodiments, the function of causing the set of one or more actions to be carried out may involve triggering the client application to report additional log information for the runtime session to the back-end platform, such as one or more additional levels of log information. And in such example embodiments, the function of causing the set of one or more actions to be carried out could additionally involve triggering the client application to capture the additional log information for the runtime session that is to be reported to the back-end platform, or the configurable rules engine could cause the client application to begin provisionally capturing the additional log information for the runtime session prior to detecting the occurrence of the trigger event, in which case the client application may write the provisionally-captured log information to any of various types of storage structures within local data storage of the client device, including a ring buffer.

In other example embodiments, the function of causing the set of one or more actions to be carried out may involve causing the client application to report additional contextual information for the runtime session to the back-end platform, which may include one of (i) state information for the client application or (ii) state information for the client device.

In still other example embodiments, the function of causing the set of one or more actions to be carried out may involve causing the client application to initiate a live support session or an interactive debugging session with the provider of the client application.

In another aspect, the disclosed technology may take the form of a client device comprising at least one processor, at least one non-transitory computer-readable medium, and program instructions stored on the at least one non-transitory computer-readable medium that are executable by the at least one processor such that the client device is configured to carry out the functions of the aforementioned method.

In yet another aspect, the disclosed technology may take the form of a non-transitory computer-readable medium comprising program instructions stored thereon that are executable to cause a client device to carry out the functions of the aforementioned method.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF THE DRAWINGS

FIG. 1 is a simplified block diagram that illustrates an example network environment in which the disclosed technology may be implemented;

FIG. 4A is a diagram that illustrates operations of an example ring buffer, in accordance with the present disclosure;

FIG. 4B is a diagram that illustrates operations of an example ring buffer, in accordance with the present disclosure;

FIG. 6A is a diagram that illustrates operations of an example ring buffer, in accordance with the present disclosure;

FIG. 6B is a diagram that illustrates operations of an example ring buffer, in accordance with the present disclosure;

DETAILED DESCRIPTION

Figure 2A:
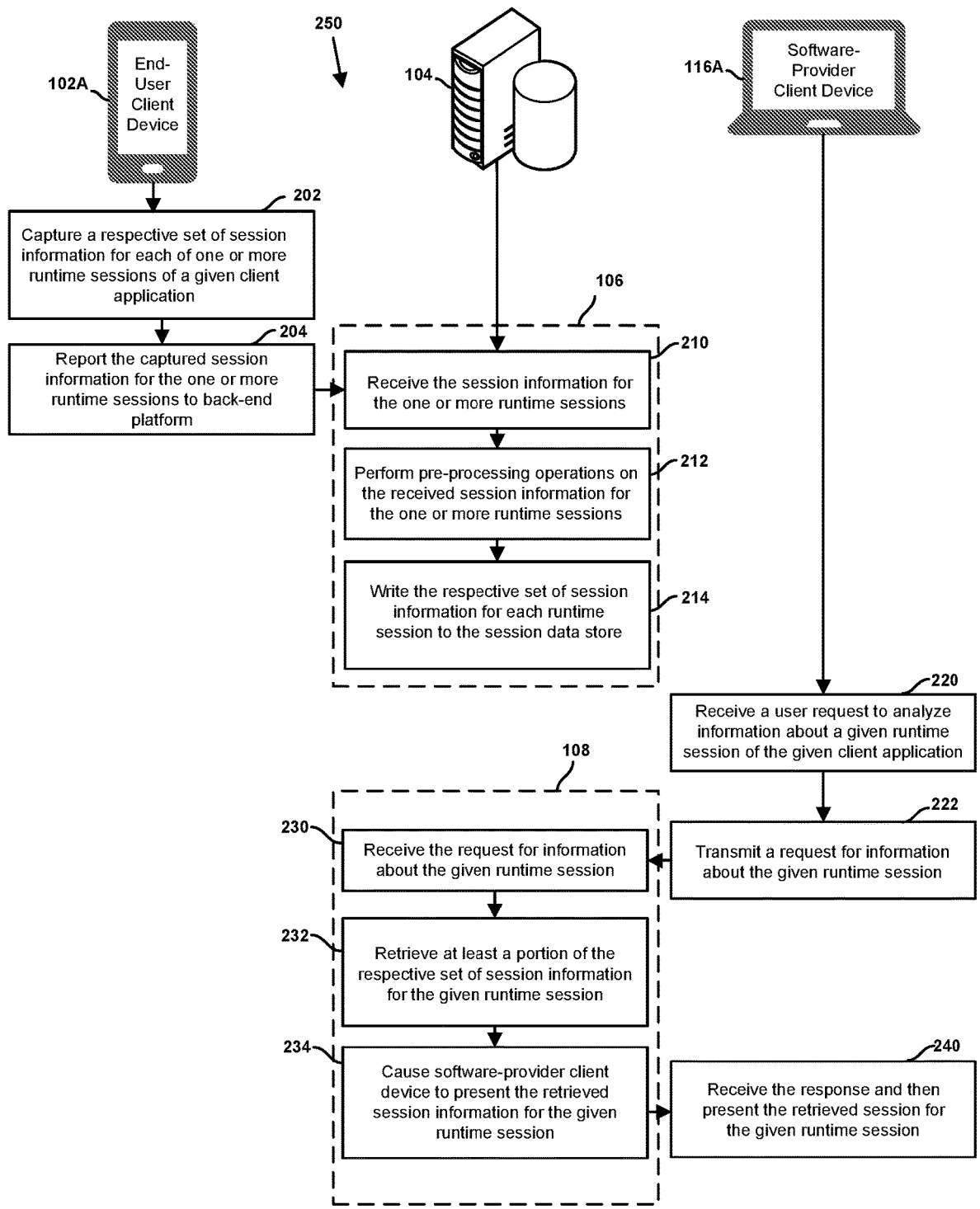
FIG. 2A is a flow diagram that shows example operations that may be carried out in accordance with the present disclosure.

As noted above, client applications of all different kinds play an increasing role in peoples' daily lives. For example, users of mobile devices such as smartphones and tablets may use a wide range of different mobile applications (or "mobile apps" for short), examples of which may include lifestyle apps (e.g., ridesharing apps, travel apps, restaurant apps, dating apps, etc.), social media apps, entertainment apps (e.g., music apps, video apps, book apps, etc.), gaming apps, news apps, and/or productivity apps, among many other possible examples. As another example, users of other types of computers such as laptops and desktops may use a wide range of different desktop applications, which may fall into similar categories. As yet another example, users of mobile devices and computers may use a wide range of web applications that run within web browsers on the users' mobile devices and computers. The types of client applications that could be installed and used on mobile devices and/or other computers may take various other forms as well.

In order to release a new client application (or a new version of a client application) to users of mobile devices or other computers, a software provider typically has to engage in a multi-stage process that involves activities such as planning the client application, designing, developing, and building the client application, testing the client application, preparing the client application for release, and then releasing the client application, among other possible activities, which can be time consuming and costly. Moreover, after the software provider releases a client application, issues with the client application often materialize that may give rise to a need for the software provider's personnel to review and evaluate the operation of the released client application in order to determine whether an updated version of the client application should be developed and released.

To facilitate this evaluation by the software provider, a client application may be designed to capture certain information about runtime sessions of the client application, such as log information and/or associated contextual information (e.g., state information for the client application and/or the client device running the client application), and then periodically send the captured information back to the software provider so that it can be reviewed and evaluated by the software provider's personnel. However, the manner in which client applications capture and report this type of information today—which may be referred to as the client application's "observability" behavior—has many limitations.

One such limitation is that the observability behavior of client applications today—including but not limited to the scope of the log information that is captured and reported by client applications today—is typically hard-coded into the client application prior to its release. For instance, the software provider typically pre-determines which log level setting to utilize for the client application (e.g., a WARN log level, an INFO log level, DEBUG log level, etc.), which defines the scope and granularity of the log information that is captured, and then hard-codes this log level setting into the client application prior to release such that all instances of the released client application will utilize that hard-coded log level setting when capturing log information during runtime sessions. In this respect, the software provider typically pre-determines which log level setting to hard-code into the client application based on a balance between the value provided by the different levels of log information and the resources required to capture and report the different levels of log information, such as the processing and storage required to capture and report the different levels of log information and/or the network bandwidth required to transmit the different levels of log information from the client device running the client application to the software provider's back-end platform.

However, the current approach of hard-coding a client application's observability behavior prior to its release impedes the software provider's ability to later modify the client application's observability behavior in a timely or efficient manner. For instance, when a situation arises where a software provider wishes to change the client application's log level setting so as to enable the client application to capture and report a more granular level of log information (e.g., log entries having a DEBUG-level or a TRACE-level), the software provider typically has to build, test, and release a new version of the client application that is hard-coded with the new log level setting, which is a time consuming (and potentially costly) process that introduces an undesirable time lag between the time when the software provider decides to change the client application's log level setting and the time when instances of the client application can actually begin capturing and reporting log information in accordance with the new log level setting.

Moreover, the current approach of hard-coding the client application's observability behavior prior to its release also inhibits the software provider's ability to tailor the client application's observability behavior based on what takes place the particular runtime session of the client application (e.g., information about the state and/or operation of the client application, the state and/or operation of the client device running the client application, and/or the end-user interaction with the client application). Instead, the client application's observability behavior will be the same for every runtime session, regardless of what took place during the runtime session. For instance, because the client application's log level setting is hard-coded, the same level of log information will be captured and reported by the client application for every runtime session regardless of whether the client application operated normally or experienced an operational issue during the runtime session, which forces the software provider into choosing between two undesirable options—it can either (i) hard-code the client application to capture and report a more granular level of log information (e.g., a DEBUG-level or a TRACE-level) for all runtime sessions at the expense of consuming more compute resources and network bandwidth, or (ii) hard-code the client application to capture and report a less granular level of log information (e.g., an INFO-level, WARN-level, ERROR-level, or FATAL-level) for all runtime sessions at the expense of missing out on other useful log information that could assist the software provider's evaluation of runtime sessions during which the client application experienced operational issues.

The current approach of hard-coding a client application's observability behavior prior to its release may present other problems as well.

To address these and other problems, disclosed herein is new software technology that enables a client application to change its observability behavior dynamically during runtime (e.g., based on the state and/or operation of the client application, the state and/or operation of the client device running the client application, or end-user interaction with the client application during a runtime session) rather than requiring that a new version of the client application be released to implement the changes to the observability behavior. To accomplish this, a client application may be embedded with a configurable rules engine that can be configured to execute one or more rules related to the observability behavior of the client application, where each such rule comprises (i) a respective type of event that is to trigger a change in the observability behavior of the client application if detected, which may be referred to herein as a "trigger event," and (ii) a respective set of one or more actions related to the observability behavior of the client application that is to be carried out if the respective type of trigger event is detected by the configurable rules engine. In this respect, once a client application's configurable rules engine is configured to execute a given rule related to the observability behavior of the client application, then during runtime sessions of the client application, the configurable rules engine may function to (i) monitor for the given rule's trigger event, and (ii) if an occurrence of the given rule's trigger event is detected, cause the one or more actions related to the observability behavior of the client application to be carried out.

In accordance with the present disclosure, the configurable rules engine that is embedded into the client application can be configured remotely by the software provider of the client application. To facilitate this functionality, disclosed herein is a new software tool that enables users acting on behalf of the software provider (e.g., developers, engineers, analysts, etc.) to create and deploy new rules related to the observability behavior of the client application. This new software tool, which may be referred to herein as a "client configuration tool," may take the form of a client-server application comprising front-end software (e.g., a web application or mobile application) that runs on client devices of users associated with the given software provider and back-end software that runs on a back-end platform of the given software provider, among other possibilities.

When a user accesses such a client configuration tool via the user's client device, the user may be presented with a user interface for creating a new rule related to the observability behavior of the client application that is to be deployed for execution by at least some instances of the client application. The user may then use the user interface presented via the user's client device to create a new rule related to the observability behavior of the client application, which comprises (i) a respective type of trigger event that is to cause a change in the observability behavior of the client application if detected and (ii) a respective set of one or more actions related to the observability behavior of the client application that is to be carried out if the respective type of trigger event is detected. Once the user has finished creating the rule, the user's client device may send, to the back-end platform hosting the client configuration tool, a request to deploy the new rule for execution by at least some instances of the client application. In turn, the back-end platform may function to (i) identify the particular instances of the client application that are to be configured to execute the new rule, (ii) generate configuration data for the new rule (e.g., data defining the new rule's trigger event and corresponding set of one or more actions), and (iii) transmit the configuration data for the new rule to client devices installed with the identified instances of the client application and thereby cause the configurable rules engine of each such instance of the client application to become configured to execute the new rule, among other possible functions performed by the back-end platform in accordance with the client configuration tool.

At a high level, a trigger event for a rule related to a client application's observability behavior may comprise a set of one or more conditions that may evaluate to true during a runtime session of the given client application. In accordance with the present disclosure, the configurable rules engine may be configured to execute rules specifying any of various different types of trigger events.

For instance, one possible type of trigger event for a rule related to a client application's observability behavior may comprise the recordation of a log entry during a runtime session of the client application that satisfies a certain condition (or set of conditions) specified as part of the rule. This specified condition could take any of various forms, examples of which may include a log entry having a specified severity level (e.g., ERROR or FATAL) or a log entry for a specified type of log event (e.g., a type of log event associated with anomalous or undesirable operation of the client application such as re-routing of a navigational route within a ridesharing application), among other possibilities.

In operation, a configurable rules engine that is configured to execute a rule involving such a trigger event based on the recordation of a log entry may function to monitor the log entries that are recorded by the client application to evaluate whether any of those log entries satisfy the specified condition (e.g., whether any log entry has a specified severity level or memorializes a specified type of log event), and if the configurable rules engine detects that a log entry satisfying the specified condition has been recorded, the configurable rules engine may determine that the rule's trigger event has occurred.

Another possible type of trigger event may comprise a trigger event that is based on some aspect of the state and/or operation of the client application that is not captured within the log information for the client application, such as a specified change in a state variable of the client application or specified type of internal action of the client application that is not recorded a log entry, among other possibilities.

In operation, a configurable rules engine that is configured to execute a rule involving such a trigger event based on the state and/or operation of the client application may function to monitor the state and/or operation of the client application (e.g., based on contextual information that is recorded by the client application), and if the configurable rules engine detects that a specified aspect of the state and/or operation of the client application meets a specified condition (or set of conditions), the configurable rules engine may determine that the rule's trigger event has occurred.

Yet another possible type of trigger event may comprise a trigger event that is based on the state and/or operation of the client device running the client application, which could take any of various forms. As one example, a trigger event based on the state and/or operation of the client device running the client application could comprise a specified type of change in the network connection state of the client device running the client application, such as a change from a first type of network connection (e.g., a cellular connection) to a second type of network connection (e.g., a Wi-Fi connection or a different type of cellular connection), among other possible types of network connection state changes that could serve as a rule's trigger event. As another example, a trigger event based on the state and/or operation of the client device running the client application could comprise a specified type of change in the geographical location of the client device running the client application, such as the client device's location entering into or leaving a specified geographical area (e.g., a geographic area designated by a geofence or the like), among other possible types of location changes that could serve as a rule's trigger event. As yet another example, a trigger event based on the state and/or operation of the client device running the client application could comprise a specified type of change in the compute resources of the client device that are being utilized to run the client application, such as a change in the processing power being used to run the client application (e.g., CPU % or GPU %) that meets a specified threshold or a change in the memory being used for the client application that meets a specified threshold, among other possible types of changes in the compute resources of the client device that could serve as a rule's trigger event. A trigger event based on the state and/or operation of the client device running the client application could take various other forms as well, including trigger events based on other state information for the client device (e.g., battery level of the client device, network library being utilized by the client device, motion state of the client device, etc.).

In operation, a configurable rules engine that is configured to execute a rule involving such a trigger event based on the state and/or operation of the client device running the client application may function to monitor the state and/or operation of the client application (e.g., based on contextual information that is recorded by the client application), and if the configurable rules engine detects that a specified aspect of the state and/or operation of the client device meets a specified condition (or set of conditions), the configurable rules engine may determine that the rule's trigger event has occurred.

Yet another possible type of trigger event may comprise a trigger event that is based on end-user interaction with the client application, such as the detection of a specified type of end-user input, which could take any of various forms. For instance, a trigger event could comprise the detection of end-user input that reports a problem with the application (e.g., a bug report) or the detection of end-user input that is associated with anomalous or undesirable operation of the client application, among other possible types of end-user input that could serve as a trigger event.

In operation, a configurable rules engine that is configured to execute a rule involving such a trigger event based on end-user interaction with the client application may function to monitor the end-user interaction with the client application for a specified type of end-user interaction, and if the configurable rules engine detects the specified type of end-user interaction, the configurable rules engine may determine that the rule's trigger event has occurred.

Still another possible type of trigger event may comprise a trigger event that is based on some other type of sensor data that is captured by the client device while running the client application, such as image data and/or audio data. For instance, one such trigger event could comprise the detection of a particular type of object within image data captured by the client device running the client application (e.g., detection of a particular type of road element within image data captured by the client device running a ridesharing application).

The types of trigger events that can be included in the rules executed by the disclosed configurable rules engine may take various other forms as well, including but not limited to the possibility that if a software provider wishes to implement a more persistent change to the observability behavior of a particular instance of the client application, the software provider could create a rule where the start of a new runtime session serves as the trigger event such that the rule's set of one or more actions related to the client application's observability behavior is carried out for every runtime session after the rule is deployed for execution.

Further, at a high level, an action for a rule related to a client application's observability behavior may comprise any action that facilitates a change in the client application's behavior as it relates to facilitating the software provider's ability to observe the client application's state and/or operation. In accordance with the present disclosure, the configurable rules engine may be configured to execute rules comprising any of various different types of actions related to the observability behavior of the client application.

For instance, one possible type of action related to the observability behavior of the client application that is to be carried out when a trigger event is detected may involve a change to the scope of log information that is captured and/or reported by the client application for a runtime session, such as by causing the client application to capture and/or report one or more additional levels of log entries (e.g., DEBUG- and/or TRACE-levels of log entries) or by causing the client application to capture and/or report one or more additional categories of log entries, among other possibilities.

In operation, the action of changing the scope of log information for a runtime session that is captured and/or reported by the client application may take various forms. As one possible implementation, the action of changing the scope of log information for a runtime session that is captured and/or reported by the client application may involve causing the client application to report additional log information for the runtime session that is provisionally captured and stored throughout the entire runtime session but is not to be reported to the back-end platform unless a trigger event for the reporting action is detected. In such an implementation, the client application may be configured to provisionally capture and store the additional log information (e.g., an additional level or category of log information) throughout the entire runtime session, and if the client application's configurable rules engine detects an occurrence of the trigger event for the action, the configurable rules engine may then cause the client application to report the provisionally-captured log information for the entire runtime session to the back-end platform (e.g., by designating the provisionally-captured log information for reporting along with the other log information that is to be reported by default).

As another possible implementation, the action of changing the scope of log information for a runtime session that is captured and/or reported by the client application may involve causing the client application to capture a snapshot of additional log information available at the time that the trigger event is detected and thereafter report said snapshot to the back-end platform. In such an implementation, the client application may not be configured to provisionally capture or store any additional log information prior to the detection of the trigger event for the action, and if the client application's configurable rules engine detects an occurrence of the trigger event for the action, the configurable rules engine may then cause the client application to capture a snapshot of the additional log information and thereafter report said snapshot to the back-end platform (e.g., by designating the captured snapshot of log information for reporting along with the other log information that is to be reported by default).

As yet another implementation, the action of changing the scope of log information for a runtime session that is captured and/or reported by the client application may involve causing the client application to capture additional log information (e.g., an additional level or category of log information) between the time that the trigger event is detected and the end of the runtime session and thereafter report the additional log information to the back-end platform. In such an implementation, the client application may not be configured to provisionally capture or store any additional log information prior to the detection of the trigger event for the action, and if the client application's configurable rules engine detects an occurrence of the trigger event for the action, the configurable rules engine may then cause the client application to (i) capture additional log information between the time that the trigger event is detected and the end of the runtime session and (ii) report the additional log information to the back-end platform (e.g., by designating the additional log information for reporting along with other log information that is to be reported by default).

The action of changing the scope of log information for a runtime session that is captured and/or reported by the client application may take other forms as well, including but not limited to the possibility that the configurable rules engine may cause the client application to capture and/or report additional log information for some other window of time, such as (i) a window of time that begins some predefined amount of time prior to when a first occurrence of the trigger event was detected and ends at the conclusion of the runtime session or (ii) a window of time that begins when a first occurrence of the trigger event was detected and ends when a predefined amount of time has elapsed since a last occurrence of the trigger event was detected, among other possibilities.

Another possible type of action related to the observability behavior of the client application that is to be carried out when a trigger event is detected may involve a change to the scope of contextual information that is captured and/or reported by the client application for a runtime session, such as by causing the client application to capture and/or report any of various types of additional contextual information for a runtime session in reaction to detecting the trigger event for the action. For example, such an action may involve capturing and/or reporting additional state information for the client application, examples of which may include one or more representations (e.g., screenshots) of the client application's user interface, thread stack information for the client application, and/or a lifecycle state information for the client application (e.g., whether the client application is in the foreground or the background), among other possible types of state information for the client application. As another example, such an action may involve capturing and/or reporting additional state information for the client device running the client application, examples of which may include information about the geographical location of the client device, the network connection state of the client device (e.g., cellular, Wi-Fi, etc.), the level of compute resources being utilized by the client device to run the client application (e.g., processing power usage, memory usage, etc.), and/or the network library being utilized by the client application while running the client application, among other possible types of state information for the client device running the client application. The action may involve capturing and/or reporting additional contextual information that takes other forms as well.

Further, in operation, the action of changing the scope of contextual information for a runtime session that is captured and/or reported by the client application may take various forms. As one possible implementation, the action of changing the scope of contextual information for a runtime session that is captured and/or reported by the client application may involve causing the client application to report additional contextual information for the runtime session that is provisionally captured and stored throughout the entire runtime session but is not to be reported to the back-end platform unless a trigger event for the reporting action is detected. In such an implementation, the client application may be configured to provisionally capture and store the additional contextual information (e.g., one or more additional types of contextual information) throughout the entire runtime session, and if the client application's configurable rules engine detects an occurrence of the trigger event for the action, the configurable rules engine may then cause the client application to report the provisionally-captured contextual information for the entire runtime session to the back-end platform (e.g., by designating the provisionally-captured contextual information for reporting along with the log and/or contextual information that is to be reported by default).

As another possible implementation, the action of changing the scope of contextual information for a runtime session that is captured and/or reported by the client application may involve causing the client application to capture a snapshot of additional contextual information available at the time that the trigger event is detected (e.g., a snapshot of one or more additional contextual attributes) and thereafter report said snapshot to the back-end platform. In such an implementation, the client application may not be configured to provisionally capture or store any additional contextual information prior to the detection of the trigger event for the action, and if the client application's configurable rules engine detects an occurrence of the trigger event for the action, the configurable rules engine may then cause the client application to capture a snapshot of the additional contextual information and thereafter report said snapshot to the back-end platform (e.g., by designating the captured snapshot of contextual information for reporting along with the log and/or contextual information that is to be reported by default).

As yet another implementation, the action of changing the scope of contextual information for a runtime session that is captured and/or reported by the client application may involve causing the client application to capture additional contextual information (e.g., one or more additional types of contextual information) between the time that the trigger event is detected and the end of the runtime session and thereafter report the additional contextual information to the back-end platform. In such an implementation, the client application may not be configured to provisionally capture or store any additional contextual information prior to the detection of the trigger event for the action, and if the client application's configurable rules engine detects an occurrence of the trigger event for the action, the configurable rules engine may then cause the client application to (i) capture additional contextual information between the time that the trigger event is detected and the end of the runtime session and (ii) report the additional contextual information to the back-end platform (e.g., by designating the additional contextual information for reporting along with the log and/or contextual information that is to be reported by default).

The action of changing the scope of contextual information for a runtime session that is captured and/or reported by the client application may take other forms as well, including but not limited to the possibility that the configurable rules engine may cause the client application to capture and/or report additional contextual information for some other window of time during the runtime session, such as (i) a window of time that begins some predefined amount of time prior to when a first occurrence of the trigger event was detected and ends at the conclusion of the runtime session or (ii) a window of time that begins when a first occurrence of the trigger event was detected and ends when a predefined amount of time has elapsed since a last occurrence of the trigger event was detected, among other possibilities.

Yet another possible type of action related to the observability behavior of the client application that is to be carried out when a trigger event is detected may involve initiating a live support session or an interactive debugging session with the software provider. This action of initiating a live support session or an interactive debugging session with the software provider may take various forms. As one possible implementation, the action of initiating a live support session or an interactive debugging session with the software provider may involve transmitting a request to initiate the live support session or interactive debugging session to the software provider's back-end platform, which may then function to establish the live support session or interactive debugging session between the client device running the client application and a client device of one of the software provider's personnel. As another possible implementation, the action of initiating a live support session or an interactive debugging session with the software provider may involve (i) obtaining identifying information for a particular client device associated with the software provider from the software provider's back-end platform and then (ii) transmitting a request to initiate the live support session or interactive debugging session to the client device associated with the software provider. Other implementations are possible as well.

Further, after initiating the interactive debugging session with the software provider, the client application may then engage in back-and-forth communication with the software provider's back-end platform and/or a client device of the software provider's personnel in order to carry out the interactive debugging session. During that time, the end user of the client application may be able to engage with the client application so that the user can attempt to re-create the situation that caused the trigger event to occur, or the end user's interaction with the client application may be temporarily disabled, among other possibilities.

Still another possible type of action related to the observability behavior of the client application that is to be carried out when a trigger event is detected may involve prompting an end user of the client application to provide some input related to the observability behavior of the client application.

For instance, as one possibility, the action of prompting an end user of the client application to provide some input related to the observability behavior of the client application may involve prompting the end user of the client application to input a confirmation that the client application has permission to perform one or more other actions in accordance with a rule that has been satisfied, such as a confirmation that the client application has permission to perform one of the other actions described above (e.g., capturing additional log information, capturing additional contextual information, initiating a live support session or interactive debugging session, etc.). As another possibility, the action of prompting an end user of the client application to provide some input related to the observability behavior of the client application may involve prompting the end user of the client application to change a given setting of the client application and/or the client device. The action of prompting an end user of the client application to provide some input related to the observability behavior of the client application may take other forms as well.

A further possible type of action related to the observability behavior of the client application that is to be carried out when a trigger event is detected may involve sending a notification of the occurrence of the trigger event to the back-end platform, which may then trigger the back-end platform to carry out a set of one or more actions based on the notification. Such back-end actions could take various forms, one example of which may involve instructing other end-user client devices to temporarily change their observability behavior.

The types of actions that can be included in the rules executed by the disclosed configurable rules engine may take various other forms as well. Further, in line with the discussion above, a rule's set of one or more actions may comprise multiple actions that could be of various different types. To illustrate with an example, a rule's set of one or more actions could include both (i) the reporting of an additional level of log information (e.g., a DEBUG-level of log entries) and also (ii) the capture and reporting of certain types of additional contextual information (e.g., a representation of the client application's user interface, thread stack information for the client application, etc.). Many other examples are possible as well.

Further, in at least some implementations, the client application's configurable rules engine could optionally be configured such that, prior to triggering the client application carry out a given action in accordance with a rule that has been satisfied (e.g., one of the actions discussed above), the configurable rules engine may make an initial determination of whether it is appropriate to proceed with the given action, which may then dictate whether or not the configurable rules engine triggers the client application carry out the given action. This initial determination may take any of various forms.

As one possible implementation, the configurable rules engine's initial determination of whether to proceed with a given action in accordance with a rule that has been satisfied may be based on information about the state of the client application and/or the client device running the client application. To illustrate with an example, if the given action involves reporting additional log information and/or contextual information to the back-end platform, the configurable rules engine may check the network connection state of the client device running the client application, and if the client device is connected to the back-end platform via a cellular network rather than a Wi-Fi network, the configurable rules engine may determine that the action of reporting of the additional log information and/or contextual information to the back-end platform should not be carried out (or at least should be delayed until a later time when the client device is connected to the back-end platform via a Wi-Fi network) to as to help avoid incurring additional costs associated with cellular data usage. Many other examples are possible as well.

As another possible implementation, the configurable rules engine's initial determination of whether to proceed with a given action in accordance with a rule that has been satisfied may be based on communications with the back-end platform. For instance, after detecting an occurrence of a trigger event for a given action, the configurable rules engine may cause the client application to notify the back-end platform that the trigger event for the given action has occurred and seek instruction as to whether to carry out the given action, which may in turn cause the back-end platform to respond with an instruction to either (i) carry out the given action, (ii) delay the action until some later point in time, or (iii) refrain from carrying out the given action. In this respect, the back-end platform may determine which of these instructions to send back to the client application in any of various manners, and in at least some examples, the back-end platform may determine which of these instructions to send back to a given instance of the client application based on an analysis of the volume of log information and/or contextual information that is being reported to the back-end platform by other instances of the client application. To illustrate with an example, if the given action involves reporting thread stack information for the client application to the back-end platform if a trigger event is detected, and the back-end platform has already received various thread stacks from other instances of the client application based on the same or a similar trigger event, then the back-end platform may instruct the given instance of the client application to refrain from reporting additional thread stack information for the client application despite the fact that the given trigger event was detected. the back-end platform's determination of which of the instructions to send back to a client application that has detected a trigger event may take various other forms as well.

As yet another possible implementation, in line with the discussion above, the configurable rules engine's initial determination of whether to proceed with a given action in accordance with a rule that has been satisfied may be based on input from an end user of the client application.

The configurable rules engine's initial determination of whether to proceed with a given action in accordance with a rule that has been satisfied may take other forms as well.

Advantageously, the disclosed technology provides various improvements over the existing technology for configuring a client application's observability behavior. For instance, unlike the existing technology, the disclosed technology provides a software provider with the ability to update the observability behavior of a client application in a timely and efficient manner by configuring the configurable rules engine disclosed herein to execute a rule that triggers a change to the observability behavior of the client application during runtime, rather than having to build, test, and release a new version of the client application. In this way, a software provider can effect a change to the client application's observability behavior in as little as a few minutes, rather than the days or weeks that it typically takes to update a client application's observability behavior via a new release.

Further, unlike the existing technology, the disclosed software technology provides a software provider with the ability to tailor a client application's observability behavior on a session-by-session basis based on what actually takes place during the runtime session of the client application, which enables the software provider to continue collecting a baseline set of log information (and perhaps a baseline set of contextual information) for runtime sessions where no trigger event was detected while at the same time enabling the software provider to collect a more in-depth set of log information and/or contextual information for runtime sessions where a trigger event was detected.

Further yet, unlike the existing technology, the disclosed software technology provides a software provider with the ability to change the observability behavior of different instances of the client application in different ways, which allows for additional customization of the client application's observability behavior.

The disclosed technology provides various other improvements over the existing technology for configuring a client application's observability behavior as well.

In accordance with the present disclosure, a client application's configurable rules engine could also be configured to execute one or more rules related to some other aspect of the client application's operation as well (i.e., some aspect of the client application's operation that does not relate to its observability behavior), where each such rule comprises (i) a respective type of trigger event that is to trigger a change in the operation of the client application if detected, and (ii) a respective set of one or more actions related to the operation of the client application that is to be carried out if the respective type of trigger event is detected by the configurable rules engine. In this respect, once a client application's configurable rules engine is configured to execute such a rule, then during runtime sessions of the client application, the configurable rules engine may likewise function to (i) monitor for the given rule's trigger event, and (ii) if an occurrence of the given rule's trigger event is detected, cause the one or more actions related to the operation of the client application to be carried out.

Turning now to FIG. 1, a simplified block diagram is provided that illustrates an example network environment 100 in which the disclosed technology for dynamically configuring the observability behavior of a given client application released by a given software provider may be implemented. As shown in FIG. 1, the example network environment 100 may include a plurality of end-user client devices 102 that are installed with a given client application, of which end-user client devices 102A, 102B, and 102C are shown as representative examples, a back-end platform 104 of the given software provider, and a plurality of software-provider client devices 116, of which software-provider client devices 116A, 116B, and 116C are shown as representative examples. Further, while the disclosed technology is at times described below with reference to the end-user device 102A and the software-provider client device 116A, it should be understood that the discussion may be applicable to any of the end-user devices 102A-C and any of the software-provider client devices 116A-C shown in FIG. 1.

In line with the discussion above, the given client application that is installed on each of the end-user client devices 102A-C can take any of various forms, including but not limited to any of the different forms of client applications described above (e.g., a mobile application, desktop application, web application, or the like). Further, in line with the discussion above, the given client application may be embedded with the configurable rules engine that is disclosed herein.

In general, each of the end-user client devices 102A-C may take the form of any client device that is capable of running an instance of the given client application. In this respect, each of the end-user client devices 102A-C includes hardware components such as one or more processors, data storage, one or more communication interfaces, and input/output (I/O) components, among other possible hardware components. The end-user client devices 102A-C also include software components such as operating system software and the given client application, among various other possible software components. As representative examples, each of the end-user client devices 102A-C could be any of a smartphone, a tablet, a laptop, or a desktop computer, among other possibilities, and it should be understood that different end-user client devices 102A-C could take different forms (e.g., different types and/or models of client devices).

Further, as shown in FIG. 1, each of the end-user client devices 102A-C may be configured to communicate with the back-end platform 104 of the given software provider over a respective communication path. Each of these respective communication paths may generally comprise one or more data networks and/or data links, which may take any of various forms. For instance, each respective communication path between an end-user client device 102 and the back-end platform 104 may include any one or more of Personal Area Networks (PANs), Local Area Networks (LANs), Wide Area Networks (WANs) such as the Internet or cellular networks, cloud networks, and/or point-to-point data links, among other possibilities. Further, the data networks and/or links that make up each respective communication path may be wireless, wired, or some combination thereof, and may carry data according to any of various different communication protocols. Although not shown, the respective communication paths may also include one or more intermediate systems, examples of which may include a data aggregation system and host server, among other possibilities. Many other configurations are also possible.

As further shown in FIG. 1, the back-end platform 104 of the given software provider may comprise an integration pipeline 106, a session analysis service 108, a session data store 110, a client configuration service 112, and a rules data store 114, among other possibilities. Each of these functional components of the back-end platform 104 may be configured to perform certain back-end functionality in accordance with the present disclosure.

For instance, the integration pipeline 106 of the back-end platform 104 may generally be configured to (i) receive information for runtime sessions of the given client application that was captured and reported by the end-user client devices 102A-C, such as log information and/or associated contextual information, (ii) prepare such information for storage in the session data store 110 and subsequent use by the session analysis service 108, wherein such preparation may involve performing certain pre-processing operations on the log information (e.g., validation, cleansing, deduplication, filtering, aggregation, summarization, enrichment, restructuring, reformatting, translation, mapping, etc.), and then (iii) write the received information for runtime sessions of the given client application to the session data store 110, which may then be accessible by the session analysis service 108 as well as other functional subsystems of the back-end platform 104.

Further, the session analysis service 108 of the back-end platform 104 may generally be configured to perform back-end functionality for enabling users associated with the given software provider to review and analyze information for runtime sessions of the given client application (e.g., log information and/or associated session information), which may involve (i) receiving a request from a given software-provider client device 116 to access information for a given runtime session of the given client application, (ii) retrieving certain information for the given runtime session of the given client application from the session data store 110 (e.g., session details, log information, and/or associated contextual information), and (iii) transmitting a response to the given software-provider client device 116 that comprises at least a portion of the retrieved information for the given runtime session of the given client application along with instructions for presenting the information, among other possible back-end functions related to the review and analysis of information for a runtime session that may be performed by the session analysis service 108.

Further yet, the client configuration service 112 of the back-end platform 104 may generally be configured to perform back-end functionality for enabling users associated with the given software provider to create and deploy new rules related to the observability behavior of the client application. This back-end functionality may involve (i) receiving a request from a given software-provider client device 116 to deploy a new rule related to the observability behavior of the client application for execution by at least one instance of the client application, where the new rule may comprise a respective type of trigger event that is to cause a change in the observability behavior of the client application and a respective set of one or more actions related to the observability behavior of the client application that is to be carried out when the trigger event is detected, (ii) generating configuration data for the new rule (e.g., data defining the new rule's trigger event and corresponding set of one or more actions), (iii) transmitting the configuration data for the new rule to end-user client device(s) 102 installed with the identified instance(s) of the client application and thereby causing the configurable rules engine of each such instance of the client application to become configured to execute the new rule, and (iv) writing the configuration data for the new rule to the rules data store 114, perhaps along with other data related to the new rule such as execution data for the rule (e.g., a listing of runtime sessions during which the rule was satisfied), any of which may then be accessible by the client configuration service 112 as well other functional subsystems of the back-end platform 104. The client configuration service 112 may be configured to perform other back-end functions for creating and deploying rules related to the observability behavior of the client application as well.

In practice, the back-end platform 104 of the given software provider may comprise some set of physical computing resources (e.g., processors, data storage, etc.) utilized to implement the foregoing functional subsystems. This set of physical computing resources may take any of various forms. As one possibility, the back-end platform 104 may comprise cloud computing resources supplied by a third-party provider of "on demand" cloud computing resources, such as Amazon Web Services (AWS), Amazon Lambda, Google Cloud Platform (GCP), Microsoft Azure, or the like. As another possibility, the back-end platform 104 may comprise "on-premises" computing resources of the given software provider (e.g., servers owned by the given software provider). As yet another possibility, the back-end platform 104 may comprise a combination of cloud computing resources and on-premises computing resources. Other implementations of the back-end platform 104 are possible as well.

Further, in practice, the functional components of the example back-end platform 104 may be implemented using any of various software architecture styles, examples of which may include a microservices architecture, a service-oriented architecture, and/or a serverless architecture, among other possibilities, as well as any of various deployment patterns, examples of which may include a container-based deployment pattern, a virtual-machine-based deployment pattern, and/or a Lambda-function-based deployment pattern, among other possibilities.

Turning lastly to the software-provider client devices 116A-C, each of the software-provider client devices 116A-C may generally take the form of any client device that is capable of running front-end software for accessing and interacting with the session analysis service 108 and/or the client configuration service 112, such as front-end software for a session analysis tool and/or a client configuration tool. In this respect, each of the software-provider client devices 116A-C includes hardware components such as one or more processors, data storage, one or more communication interfaces, and I/O components, among other possible hardware components, as well as software components such as operating system software and front-end software that is capable of interfacing with the session analysis service 108 and/or the client configuration service 112 (e.g., a mobile application, desktop application, or web browser), among various other possible software components. As representative examples, each of the software-provider client devices 116A-C could be any of a smartphone, a tablet, a laptop, or a desktop computer, among other possibilities, and it should be understood that different software-provider client devices 116A-C could take different forms (e.g., different types and/or models of client devices).

Further, each of the software-provider client devices 116A-C may be configured to communicate with the back-end platform 104 of the given software provider over a respective communication path that may take a similar form to the respective communication paths between the end-user client devices 102A-C may and the back-end platform 104.

Figure 2B:
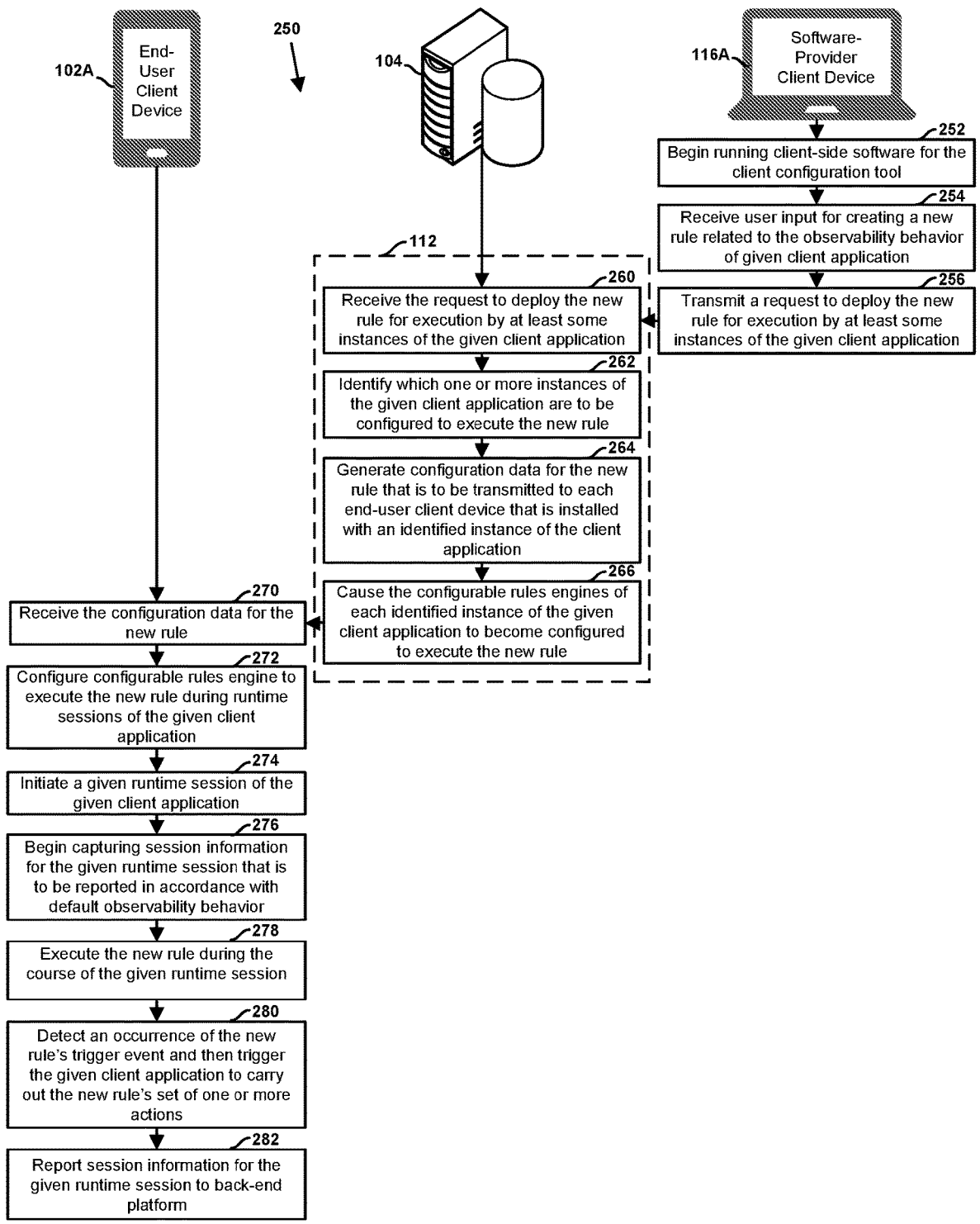
FIG. 2B is a flow diagram that shows example operations that may be carried out in accordance with the present disclosure.

Turning now to FIGS. 2A-2B, flow diagrams 200 and 250 are provided that show some example operations that may be carried out in accordance with the present disclosure. For purposes of illustration only, the operations are described as being carried out by the example end-user client device 102A that is installed with an instance of the given client application, the example back-end platform 104, and the example software-provider client device 116A within the example network environments of FIGS. 2A-2B. It should be understood, however, that this functionality may be carried out by any of various other devices in any of various other network environments as well.

Beginning with FIG. 2A, the given client application installed on the end-user client device 102A may initially be configured to operate in accordance with its default observability behavior, which may comprise the observability behavior that is defined in the released version of the client application. This default observability behavior may involve (i) capturing and reporting a default scope of log information for runtime sessions (e.g., a default log level setting and perhaps other default settings related to the manner in which the given client application captures and reports log information) and perhaps also (ii) capturing and reporting a default scope of associated contextual information for runtime sessions (e.g., a default set of contextual attributes and perhaps other default settings related to the manner in which the given client application captures and reports contextual information), among other possible aspects of the given client application's default observability behavior.

To illustrate with an example, the given client application's default observability behavior may comprise (i) capturing and reporting log information in accordance with a default log level setting such as INFO so that log entries having a severity level of INFO or higher will be captured and reported by default by the given client application and (ii) capturing and reporting contextual information for a default set of contextual attributes that includes at least one attribute related to the state of the given client application (e.g., lifecycle state) or the client device running the given client application (e.g., network connection state). However, the given client application's default observability behavior may take any of various other forms as well.

At block 202, while operating in accordance with its default observability behavior, the given client application installed on the end-user client device 102A may capture a respective set of log information and/or associated contextual information for each of one or more runtime sessions. In this respect, the respective set of log information and/or associated contextual information that is captured for each runtime session may comprise the default scope of log information and default scope of contextual information that is defined as part of the given client application's default observability behavior.

In conjunction with capturing the respective set of log information and/or associated contextual information for a runtime session, the given client application may write the respective set of log information and/or associated contextual information to the local data storage of end-user client device 102A. For instance, after capturing each new log entry and/or each new snapshot of associated contextual information, the given client application may write the new log entry and/or the new snapshot of associated contextual information to the local data storage of end-user client device 102A. In accordance with the present disclosure, such log information and/or associated contextual information may be written to the client device's local data storage utilizing any of various storage architectures, including but not limited to the example storage architectures that are described below.

Additionally, prior to writing the respective set of log information and/or associated contextual information for a runtime session to the local data storage of end-user client device 102A, the given client application may optionally perform any of various types of pre-processing operations on the log information and/or associated contextual information for the runtime session, examples of which may include pre-processing operations such as validation, cleansing, deduplication, filtering, aggregation, summarization, enrichment, restructuring, reformatting, translation, and/or mapping, among others.

Turning next to block 204, while operating in accordance with its default observability behavior, the given client application installed on the end-user client device 102A may report the captured log information and/or associated contextual for the one or more runtime sessions to the back-end platform 104. This function may take various forms, and in at least some implementations, may involve (i) preparing the log information and contextual information for transmission to the back-end platform 104 (e.g., by retrieving the log information and/or contextual information from the local data storage of the end-user client device 102A and packaging it up into a message structure that is readable by the back-end platform 104) and then (ii) causing the respective set log information and/or contextual information for each of the one or more runtime sessions to be transmitted over the respective communication path between the end-user client device 102A and the back-end platform 104, which as noted above may include one or more data networks and/or data links.

In practice, the given client application may report the respective sets of log information and/or associated contextual information for the one or more runtime sessions of the given client application to the back-end platform 104 at any of various times. In one implementation, the given client application may be configured to report the respective set of log information and/or associated contextual information for a runtime session to the back-end platform 104 at the time that the runtime session of the given client application concludes (e.g., given client application may be configured to report a runtime session's respective set of log information and/or associated context information in response to determining that the runtime session has been terminated). In another implementation, the given client application may be configured such that, if a runtime session concludes at a time when the end-user client device 102A is only connected to a cellular network and not a Wi-Fi network, the given client application may wait to report the respective set of log information and/or associated contextual information for the runtime session to the back-end platform 104 until the end-user client device 102A re-connects to a Wi-Fi network in order to avoid utilizing cellular data to transmit the respective set of log information and/or associated contextual information for the runtime session—which could result in the end-user client device 102A sending respective sets of log information and/or associated contextual information for multiple runtime sessions that have taken place since the end-user client device's last connection to a Wi-Fi network. The given client application may report the respective sets of log information and/or associated contextual information for the one or more runtime sessions of the given client application to the back-end platform 104 at other times as well.

Further, while the given client application may be configured to report both log information and associated contextual information for a runtime session to the back-end platform 104, in some implementations, the log information and associated contextual information could be captured and maintained by the given client application as separate datasets. In such implementations, the given client application could be configured to report a runtime session's log information and contextual information to the back-end platform 104 either during a single communication session with the back-end platform 104 or over the course of multiple separate communication sessions with the back-end platform 104 (e.g., one session for the log information and one for the contextual information) that could take place at the same time or different times, among other possibilities as to the particular manner in which the log information and contextual information for a runtime session could be reported to the back-end platform 104.

Further yet, along with reporting the respective set of log information and/or associated contextual information for a runtime session to the back-end platform 104, the given client application may also report certain session details for the runtime session, such as a session ID, application information for the given client application (e.g., version information), device information for the end-user client device 102A on which the runtime session of the given client application occurred (e.g., brand, model, operating system version, etc.), and/or duration information for the runtime session, among other possibilities.

As shown at block 210, the integration pipeline 106 may then receive the log information and/or associated contextual information for the one or more runtime sessions (along with the corresponding session details) that was captured and reported by the given client application running on the end-user client device 102A in accordance with given client application's default observability behavior.

In turn, at block 212, the integration pipeline 106 may perform certain pre-processing operations on the received log information and/or contextual information for the one or more runtime sessions of the given client application. These pre-processing operations may take any of various forms.

As one possibility, the integration pipeline's pre-processing operations may involve any of various operations for preparing the log information and/or contextual information for further use by the back-end platform 104, including but not limited to operations such as validation, cleansing, deduplication, filtering, aggregation, summarization, enrichment, restructuring, reformatting, translation, and/or mapping, among others. As another possibility, if the log information and associated contextual information are received as separate datasets (e.g., in instances where the given client application captures and records the log information and the contextual information as separate data records), the integration pipeline's pre-processing operations may involve functionality for (i) identifying associations between log entries and snapshots of contextual information, and (ii) memorializing the identified associations between said log entries and snapshots of contextual information for later use. The integration pipeline's pre-processing operations may take other forms as well.

At block 214, the integration pipeline 106 may then write the respective set of log information and/or associated contextual information for each runtime session of the given client application to the session data store 110, so that the respective set of log information and/or associated contextual information for each runtime session of the given client application is available for future retrieval and use by the session analysis service 108 and perhaps also other functional systems of the given software provider's back-end platform 104. Additionally, along with the respective set of log information and/or contextual information for each runtime session of the given client application, the integration pipeline 106 may also write the received session details for each runtime session of the given client application (e.g., session ID, application information for the given client application, device information for the end-user client device 102 on which the respective runtime session of the given client application occurred, and/or duration information for the respective runtime session).

After the respective set of log information and/or associated contextual information for a runtime session has been written to the session data store 110, a user associated with the software provider (e.g., a developer, engineer, analyst, or the like) may be able to access and view information about the runtime session in order to facilitate the user's analysis of the runtime session. For instance, when a user associated with the software provider wishes to perform an analysis of a given runtime session of the given client application, the user may begin by launching a session analysis tool on a given software-provider client device 116 such as the software-provider client device 116A, which may cause the software-provider client device 116A to begin running client-side software for the launched session analysis tool. In practice, this client-side software for the session analysis tool may take the form of a mobile application, a web application, or a desktop application, among other possibilities, and may comprise a user interface that enables the user to view information about runtime sessions of the given client application.

As shown at block 220, while running client-side software for the launched session analysis tool, the software-provider client device 116A may then receive user input comprising a request by the user to view information about the given runtime session. This user input may take various forms, examples of which may include a user input of a Session ID for the given runtime session or a user selection of the given runtime session from a displayed list of available runtime sessions of the given client applications, among other possibilities.

Turning next to block 222 after receiving the user input comprising a request by the user to view information about the given runtime session, the software-provider client device 116A may transmit a request to the session analysis service 108 for information about the given runtime session of the given client application (e.g., a runtime session of the given client application that was captured by the end-user client device 102A) that is to be presented to the user of the software-provider client device 116A for review and analysis. In practice, this request may take the form of one or more request messages (e.g., one or more HTTP messages) that are sent over the respective communication path between the software-provider client device 116A and the back-end platform 104, and in at least some implementations, the one or more request messages may be sent via an Application Programming Interface (API). However, the software-provider client device's request may take other forms as well.

Further, the request for the information about the given runtime session of the given client application that is sent from the software-provider client device 116A to the back-end platform 104 may take various forms, and in at least some implementations, may include identifying information for the given runtime session of the given client application session (e.g., an application ID, a session ID, etc.) for which the information is being requested.

At block 230, the session analysis service 108 of the back-end platform 104 may then receive the request for the information about the given runtime session that was sent by the software-provider client device 116A.

In turn, at block 232, the session analysis service 108 may retrieve at least a portion of the respective set of log information and/or associated contextual information for the given runtime session of the given client application from the session data store 110 (perhaps along with the corresponding session details for the given runtime session). To accomplish this, the session analysis service 108 may utilize the identifying information for the given runtime session of the given client application that is included in the received request to locate the respective set of log information and/or associated contextual information for the given runtime session of the given client application that is stored within the session data store 110.

Then, at block 234, the session analysis service 108 may cause the software-provider client device 116A to present the retrieved log information and/or associated contextual information for the given runtime session of the given client application. To accomplish this, the session analysis service 108 may transmit a response to the software-provider client device 116A that comprises instructions and data for constructing a user-interface view that presents the information for the given runtime session of the given client application. In practice, this response may take the form of one or more response messages (e.g., one or more HTTP messages) that are sent over the respective communication path between the back-end platform 104 and the software-provider client device 116A, and in at least some implementations, the one or more response messages may be sent via an API. However, the session analysis service's response may take other forms as well.

At block 240, the software-provider client device 116A may receive the response from the session analysis service 108 and then present the retrieved log information and/or associated contextual information for the given runtime session of the given client application via a user-interface view displayed on the software-provider client device 116A, which may take any of various forms. Thereafter, the user of the software-provider client device 116A may then review and analyze the log information and/or associated contextual information for the given runtime session of the given client application that is presented via the user-interface view.

After the given client application has been released and the installed instances of the given client application installed have begun operating in accordance with the given client application's default observability behavior, the technology disclosed herein may then enable a user associated with the given software provider (e.g., a developer, engineer, analyst, or the like) to create a new rule related to the observability behavior of the given client application that is to be deployed for execution by at least some instances of the given client application, which could include the instances of the given client application installed on at least some of the end-user client devices 102 of FIG. 1. An example of this functionality with now be described with reference to FIG. 2B.

Beginning at block 252, when a user associated with the software provider wishes to create a new rule related to the observability behavior of the given client application that is to be deployed for execution by at least some instances of the given client application, the user may start by launching a client configuration tool on a given software-provider client device 116 such as the software-provider client device 116A, which may cause the software-provider client device 116A to begin running client-side software for the launched client configuration tool. In practice, this client-side software for the client configuration tool may could take the form of a mobile application, a web application, or a desktop application, among other possibilities, and may comprise a user interface that enables the user to create a new rule related to the observability behavior of the given client application that is to be deployed for execution by at least some instances of the given client application. This user interface may enable the user to create a new rule related to the observability behavior of the given client application in any various ways. For instance, as one possibility, the user interface may guide the user through a workflow where the user is presented with one or more user-interface views that enable the user to provide user input specifying (i) a trigger event for the rule and (ii) a set of one or more actions for the rule. In this respect, one or more user-interface views may comprise lists of user-selectable options (e.g., predefined types of trigger events and/or actions that are available for selection and/or predefined types of parameters that can be utilized to define a trigger event) and/or user-fillable fields (e.g., a field for specifying a value of a given parameter that defines a trigger event) that may be utilized by the user to specify the trigger event and the set of one or more actions for the rule, among other possibilities. As another possibility, the user interface may provide the user with an ability to input or upload structured configuration data that specifies the trigger event and the set of one or more actions for the new rule.

Additionally, along with enabling the user to provide user input specifying the trigger event and the set of one or more actions for the new rule, the user interface may enable the user to input identifying information for the new rule, such as a name of the new rule, a category of the new rule, and/or a brief description of the new rule, among other possibilities.

Additionally yet, along with enabling the user to provide user input specifying the trigger event and the set of one or more actions for the new rule, the user interface may optionally enable the user to input information indicating which particular instances of the given client application that are to be configured to execute the new rule. For example, the user interface may enable a user to input any of (i) identifying information for one or more specific instances of the given client application that are to be configured to execute the new rule (e.g., a unique identifier of a specific instance of the given client application and/or an end-user client device installed with a specific instance of the given client application), (ii) criteria for identifying instances of the given client application that are to be configured to execute the new rule, such as criteria regarding the geographical locations of the end-user client devices installed with instances of the given client application and/or criteria regarding the versions of the installed instances of the given client application, among other possibilities, or (iii) an indication that every installed instance of the given client application should be configured to execute the rule. However, the user may also forgo inputting information indicating which particular instances of the given client application that are to be configured to execute the new rule, in which case the back-end platform 104 may identify which instances of the given client application are to be configured to execute the new rule based on something other than user input.

The user interface for creating a new rule related to the observability behavior of the given client application may take other forms as well.

At block 254, while running the client-side software for the client configuration tool, the software-provider client device 116A may receive user input for creating a new rule related to the observability behavior of the given client application that comprises (i) a specified trigger event that is to cause a change in the observability behavior of the given client application if detected and (ii) a specified set of one or more actions related to the observability behavior of the given client application that is to be carried out when the trigger event is detected. In this respect, the specified trigger event and the specified set of one or more actions for the new rule may each take any of various forms, including but not limited to any of the forms previously described. Further, the user input for creating the new rule may take any of various forms, including but not limited to user input specifying the trigger event and the set of one or more actions for the rule, user input specifying identifying information for the new rule (e.g., name, category, brief description, etc.), and perhaps also user input specifying information indicating which particular instances of the given client application are to be configured to execute the new rule, among others.

At block 256, after receiving the user input for creating the new rule related to the observability behavior of the given client application, the software-provider client device 116A may transmit a request to the client configuration service 112 to deploy the new rule for execution by at least some instances of the given client application. In practice, this request may take the form of one or more request messages (e.g., one or more HTTP messages) that are sent over the respective communication path between the software-provider client device 116A and the back-end platform 104, and in at least some implementations, the one or more request messages may be sent via an API. However, the software-provider client device's request to deploy the new rule for execution may take other forms as well.

Further, the request to deploy the new rule for execution may include any of various information related to the new rule. For instance, in line with the discussion above, the request to deploy the new rule for execution may include information specifying the trigger event and the set of one or more actions for the new rule, identifying information for the new rule (e.g., name, category, brief description, etc.), and perhaps also information indicating which particular instances of the given client application are to be configured to execute the new rule, which could take any of the various forms described above. The request to deploy the new rule for execution may include other types of information and/or take other forms as well.

At block 260, the client configuration service 112 of the back-end platform 104 may then receive the request to deploy the new rule for execution by at least some instances of the given client application that was sent by the software-provider client device 116A. In turn, the client configuration service 112 may carry out various operations in order to deploy the new rule for execution by at least some instances of the given client application.

For instance, at block 262, the client configuration service 112 may identify which one or more instances of the given client application are to be configured to execute the new rule. This function of identifying which one or more instances of the given client application are to be configured to execute the new rule may take various forms.

In some implementations, the client configuration service 112 may be configured to deploy each new rule for execution by some predefined universe of currently-installed instances of the given client application—such as all currently-installed instances of the given client application—in which case the client configuration service 112 may function to identify that predefined universe of currently-installed instances of the given client application as the instances of the given client application that are to be configured to execute the new rule.

In other implementations, the client configuration service 112 may be configured to identify which one or more instances of the given client application are to be configured to execute the new rule based on information included in the request to deploy the new rule for execution that is received from the software-provider client device 116A. This function may take various forms, which may depend in part on the nature of the information included in the request to deploy the new rule for execution.

For instance, in a scenario where the request to deploy the new rule for execution includes identifying information for one or more specific instances of the given client application that are to be configured to execute the new rule, the client configuration service 112 may identify at least the one or more specific instances of the given client application as instances of the given client application that are to be configured to execute the new rule. Further, in such a scenario, the client configuration service 112 could also optionally be configured to identify additional instances of the given application that are to be configured to execute the new rule, such as additional instances of the given client application that share some common characteristic with the one or more specific instances of the given client application identified in the request to deploy the new rule for execution (e.g., being installed on similar types of end-user client devices and/or being installed on end-user client device that are located in a similar geographic area, etc.).

Alternatively, in a scenario where the request includes criteria for identifying instances of the given client application, the client configuration service 112 may identify the instances of the given client application that are to be configured to execute the new rule by evaluating which currently-installed instances of the given client application satisfy the criteria. For example, if the request includes criteria for identifying instances of the given client application that are installed on the end-user client devices located within a specified geographic area, the client configuration service 112 may evaluate the geographic locations of end-user client devices that are currently installed with the given client application in order to determine which of those end-user client devices have a geographic location within specified geographic area and may then identify the instances of the given client application installed on those end-user client devices as the instances of the given client application that are to be configured to execute the new rule. As another example, if the request includes criteria for identifying instances of the given client application that of a specified version, the client configuration service 112 may evaluate the versions of the currently-installed instances of the given client application in order to determine which of the currently-installed instances of the given client application have the specified version and may then identify those currently-installed instances as the instances of the given client application that are to be configured to execute the new rule. Various other examples are possible as well.

Alternatively yet, in a scenario where the request includes an indication that every installed instance of the given client application should be configured to execute the new rule, the client configuration service 112 may identify all currently-installed instances of the given client application as instances of the given client application that are to be configured to execute the new rule.

The function of identifying which one or more instances of the given client application are to be configured to execute the new rule based on information included in the request to deploy the new rule for execution that is received from the software-provider client device 116A may take various other forms as well.

The client configuration service's functionality for identifying which one or more instances of the given client application are to be configured to execute the new rule in other manners as well—including but not limited to the possibility that this functionality could also involve an evaluation of whether the currently-installed instances of the given client application have the capability to execute the new rule (e.g., based on factors such as the permissions assigned to the installed instance of the given client application and/or the data that is available to the installed instance of the given client application).

Further, in order to facilitate this functionality of identifying which one or more instances of the given client application are to be configured to execute the new rule, the client configuration service 112 may have access to information regarding the currently-installed instances of the given client application and/or the end-user client devices on which such instances are installed, among other possible information that may facilitate the functionality of identifying which one or more instances of the given client application are to be configured to execute the new rule.

At block 264, after receiving the request to deploy the new rule for execution, the client configuration service 112 may also generate configuration data for the new rule that is to be transmitted to each end-user client device that installed with an identified instance of the given client application. At a high level, this configuration data for the new rule may comprise data defining the trigger event and the set of one or more actions for the new rule, which may be represented in a structured format that can be used to generate executable logic for a configurable rule engines of the given client application. Additionally, the generated configuration data for the new rule may include or be associated with an identifier of the new rule (e.g., a rule ID generated by the client configuration service 112). The generated configuration data for the new rule may take other forms as well. Further, in some implementations, it is possible the request to deploy the new rule for execution could include structured configuration data for the new rule, in which case the function of generating the configuration data for the new rule may involve extracting the structured configuration data from the request and then perhaps updating and/or supplementing the structured configuration data. Thereafter, at block 266, the client configuration service 112 may cause the configurable rules engine of each identified instance of the given client application to become configured to execute the new rule. To accomplish this, the client configuration service 112 may transmit the configuration data for the new rule to each end-user client device that is installed with an identified instance of the given client application. For instance, as shown in FIG. 2B, the client configuration service 112 may transmit the configuration data for the new rule to the end-user client device 102A, which may be one of the end-user client devices installed with an identified instance of the given client application. In this respect, the configuration data for the new rule may be packaged into one or more messages (e.g., one or more HTTP messages) that are sent over the respective communication path between the back-end platform 104 and the end-user client device 102A, and in at least some implementations, the one or more request messages may be sent via an API. Along similar lines, the client configuration service 112 may also transmit the configuration data for the new rule to either or both of the end-user client devices 102B-C.

Although not shown in FIG. 2B, the client configuration service 112 may also write certain information about the deployed rule to the rules data store 114. The information about the deployed rule that is written to the rules data store 114 may take various forms, examples of which may include information about the new rule that was included in the request to deploy the new rule for execution and/or the generated configuration data for the new rule, among other possibilities.

At block 270, the given client application installed on end-user client device 102A may receive the configuration data for the new rule that is sent by the back-end platform 104. In turn, at block 272, the given client application installed on the end-user client device 102A may, based on the configuration data for the new rule, configure its configurable rules engine to execute the new rule during runtime sessions of the given client application. For instance, the given client application may utilize the configuration data for the new rule to generate executable logic (e.g., program code) for the configurable rules engine and then configure the configurable rules engine to execute the executable logic during runtime sessions of the given client application, among other possible ways that the given client application may configure its configurable rules engine to execute the new rule based on the configuration data.

At block 274, after the given client application's configurable rules engine has been configured to execute the new rule during runtime sessions of the given client application, the end-user client device 102A may initiate a given runtime session of the given client application.

At block 276, in response to the given runtime session of the given client application being initiated, the given client application may begin capturing log information and/or associated contextual information for the given runtime session that is to be reported in accordance with the default observability behavior of the given client application, among other possible actions that the given client application may carry out in accordance with its default observability behavior.

At block 278, in response to the given runtime session of the given client application being initiated, the given client application' configurable rules engine may also initiate execution of the new rule as applied to the given runtime session and then continue executing the new rule during the course of the given runtime session. At a high level, the configurable rules engine's execution of the new rule during the given runtime session may involve (i) monitoring for the new rule's trigger event during the given runtime session, and (ii) if an occurrence of the trigger event is detected during the given runtime session, causing the new rule's set of one or more actions to be carried out such that there is some change in the observability behavior of the given client application. In this respect, the new rule's trigger event and set of one or more actions may take any of various forms, including but not limited to any of the various forms described above. Further, if the new rule's set of one or more actions involves the reporting of additional log and/or contextual information for the entirety of a runtime session if the trigger event is detected (or some other window of time that begins prior to the trigger event), then the configurable rules engine's execution of the new rule during the given runtime session may additionally involve causing the given client application to provisionally capture the additional log and/or contextual information prior to the detection of the trigger event so as to enable such information to be reported for the portion of the given runtime session that precedes the detection of the trigger event. The configurable rules engine's execution of the new rule during the given runtime session may involve other operations as well.

At block 280, while the given client application is capturing log information and/or associated contextual information in accordance with the default observability behavior and the given client application's configurable rules engine is executing the new rule during the given runtime session, the configurable rules engine may optionally (i) detect an occurrence of the new rule's trigger event and (ii) based on detecting the occurrence of the new rule's trigger event, trigger the given client application to carry out new rule's set of one or more actions. In line with the discussion above, this may involve triggering the given client application to capture and/or report a different scope of log information and/or contextual information for the given runtime session, triggering the given client application to initiate a live support session and/or interactive debugging session, triggering the given client application to prompt the end user to provide a certain type of user input, and/or triggering the given client application to engage in some other interaction with the back-end platform 104 and/or the end user, among other possible types of actions.

At block 282, the given client application then report the log information and/or associated contextual information for the given runtime session to the back-end platform 104, which may involve causing the end-user client device 102A to transmit the log information and/or associated contextual information for the given runtime session to be transmitted to the back-end platform 104 over the respective communication path between the end-user client device 102A and the back-end platform 104. In line with the discussion above, the timing of this reporting of the log information and/or associated contextual information for the given runtime may vary depending on the implementation of the client application. For instance, in one possible implementation, the given client application may report the log information and/or associated contextual information for the given runtime session to the back-end platform 104 at the time that the given runtime session concludes, regardless of whether or not the end-user client device 102A is connected to a Wi-Fi network at that time. In another implementation, if the end-user client device 102A is only connected to a cellular network and not a Wi-Fi network when the given runtime session concludes, the given client application may report the log information and/or associated contextual information for the given respective runtime session of the given client application to the back-end platform 104 at the time that the end-user client device 102A re-connects to a Wi-Fi network. The end-user client device 102A may report the log information and/or associated contextual information for the given runtime session to the back-end platform 104 at other times as well.

Further, the scope of the log information and/or associated contextual information that is reported to the back-end platform 104 at block 282 may depend on whether the new rule's trigger event was detected during the given runtime session. For instance, if the configurable rules engine did not detect the new rule's trigger event during the given runtime session, the given client application may report the default scope of log information and/or associated contextual information for the given runtime session in accordance with the default observability behavior. On the other hand, if the configurable rules engine did detect the new rule's trigger event during the given runtime session, then the given client application may report both (i) the default scope of log information and/or associated contextual information for the given runtime session and also (ii) certain additional log information and/or associated contextual information for the given runtime session in accordance with the new rule.

The back-end platform 104 may then receive and handle the log information and/or associated contextual information for the given runtime session in a similar manner to that described above in FIG. 2A.

The given client application may then continue to operate in a similar manner for each subsequent runtime session of the given client application while the configurable rules engine remains configured to execute the new rule.

Further, while the foregoing discussion is directed to creating, deploying, and configuring a configurable rules engine of the given client application to execute one new rule, it should be understood that the foregoing functionality may be carried out in order to create, deploy, and configure a configurable rules engine of the given client application to execute multiple different rules. For example, utilizing the disclosed technology, the configurable rules engine of the given client application installed on the end-user client device 102A could be configured to execute multiple different rules during runtime sessions of the given client application, in which case the configurable rules engine may monitor for multiple different types of trigger events during each runtime session of the given client application.

Further yet, after a new rule is created and deployed in the manner described above, the disclosed technology may also enable a user associated with the given software provider to update or delete a previously-deployed rule. For example, the client configuration tool's user interface may additionally enable users to edit, delete, activate, and/or deactivate a rule that has previously been deployed for execution by one or more instances of the given client application. In this respect, if a user updates or deletes a previously-deployed rule, the client configuration service 112 may then communicate with the end-user client device(s) installed with the identified instance(s) of the given client application so as to cause the configurable rules engine(s) to update or delete the previously-deployed rule.

Still further, at least some implementations, the client configuration tool's user interface could also enable users to view execution data for a rule that has previously been deployed for execution by one or more instances of the given client application (e.g., a listing of runtime sessions during which the rule was satisfied).

The functionality of creating, deploying, and configuring the given client application's configurable rules engine to execute a new rule in accordance with the disclosed technology may take various other forms as well. Further, while the disclosed technology has been described above in the context of creating, deploying, and configuring the given client application's configurable rules engine to execute a new rule related to the given client application's observability behavior, the disclosed technology may likewise be utilized to create, deploy, and configure the given client application's configurable rules engine to execute a new rule related to some other aspect of the given client application's operation.

For purposes of illustration, one example use case of the disclosed technology will now be described with reference to FIGS. 3A-3B, which show a scenario involving the example end-user client device 102A and the example back-end platform 104 of FIGS. 1 and 2A-B. In this scenario, the end-user client device 102A has been installed with an example client application 302 comprising default observability behavior 304 and a rules engine 306 (i.e., a configurable rules engine).

Figure 3A:
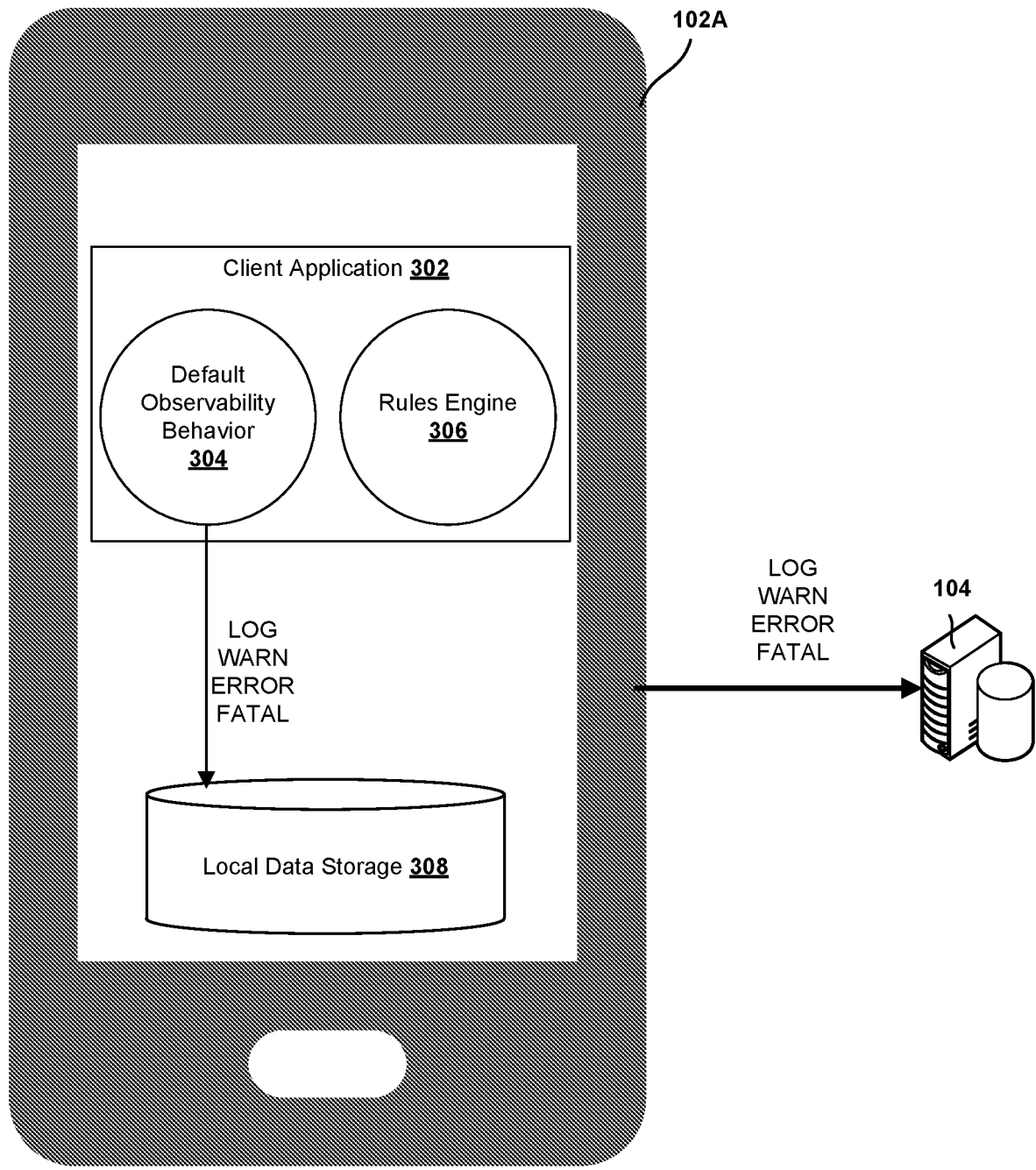
FIG. 3A is a diagram that illustrates an example use case of the disclosed technology during a first period of time while a client application is configured to operate in accordance with the client application's default observability behavior.

FIG. 3A illustrates the logging functionality of the example client application 302 during a first period of time while the client application 302 is configured to operate in accordance with the client application's default observability behavior 304 and is not executing any rules related to the client application's observability behavior. As shown, this logging functionality may involve capturing and reporting log information utilizing a log level of INFO, which means that log entries having log levels of INFO, WARN, ERROR, and FATAL will be captured and reported for runtime sessions of the client application 302 in accordance with the default observability behavior 304 of the client application 302. In this respect, during each runtime session, the client application 302 may function to capture log entries having log levels of INFO, WARN, ERROR, and FATAL, write the captured log entries having log levels of INFO, WARN, ERROR, and FATAL to local data storage 308 of the end-user client device 102A, and report the log entries having log levels of INFO, WARN, ERROR, and FATAL to the back-end platform 104 (e.g., at the conclusion of the runtime session or at some other time).

Figure 3B:
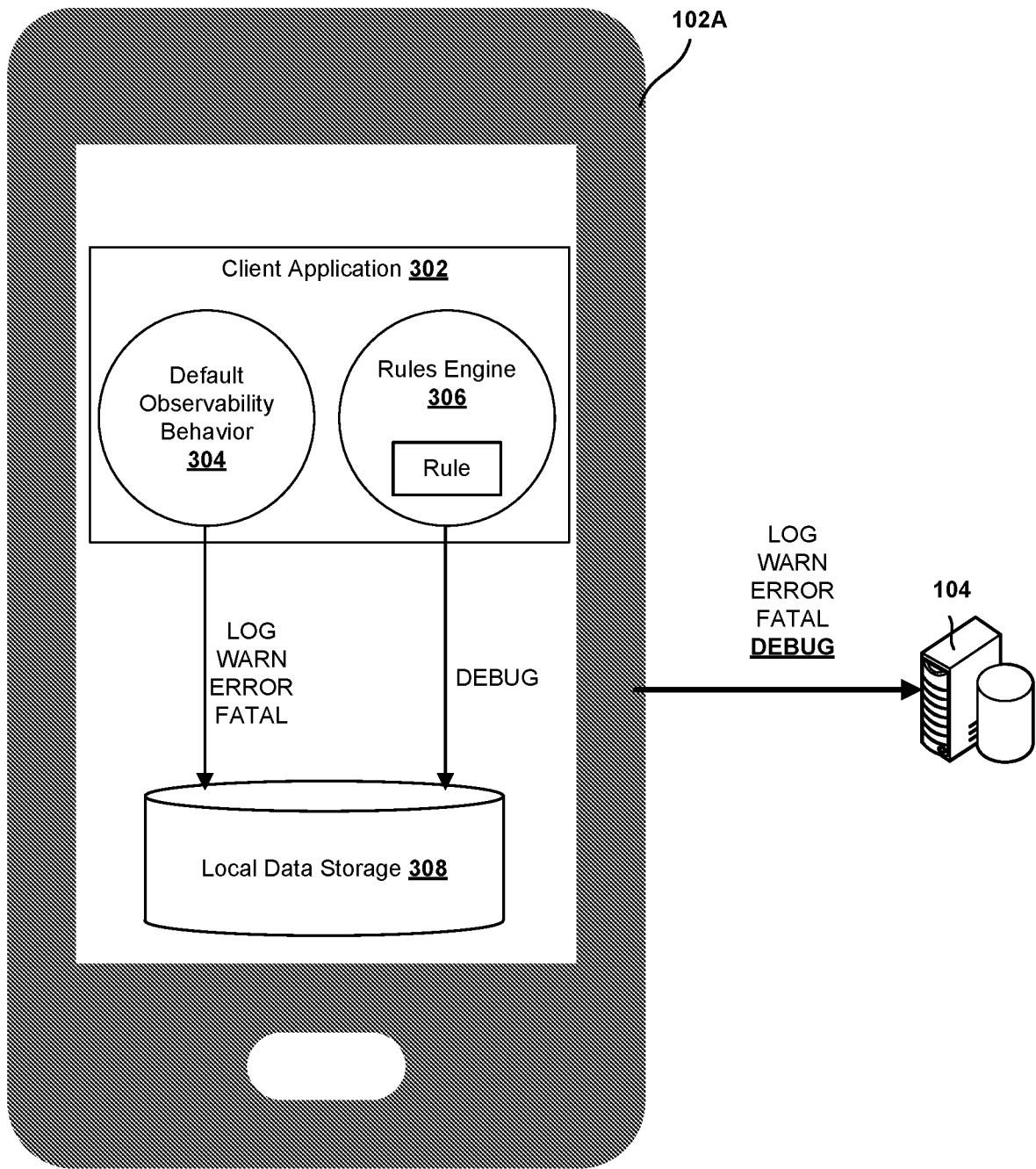
FIG. 3B is a diagram that illustrates the example use case of the disclosed technology during a second period of time while the configurable rules engine of the client application is configured to execute an example rule.

In turn, FIG. 3B illustrates the logging functionality of the example client application 302 during a second period of time while the configurable rules engine of the client application 302 is configured to execute an example rule specifying that if a specified trigger event is detected during a given runtime session of the client application 302, then the client application 302 is to additionally report log entries having a DEBUG level for the entire runtime session to the back-end platform 104. In this respect, during each runtime session, the client application 302 may continue to capture log entries having log levels of INFO, WARN, ERROR, and FATAL, write the captured log entries having log levels of INFO, WARN, ERROR, and FATAL to the local data storage 304 of the end-user client device 102A, and report the log entries having log levels of INFO, WARN, ERROR, and FATAL to the back-end platform 104. However, in addition to this logging functionality that is carried out during each runtime session in accordance with the default observability behavior 304, the client application 302 that is configured, via the rules engine 306, with the example rule may also function to provisionally capture log entries having a log level of DEBUG, write the provisionally-captured log entries having the log level of DEBUG to local data storage 308 of the end-user client device 102A, and then if the specified trigger event is detected, additionally report the log entries having the log level of DEBUG to the back-end platform 104 (e.g., at the conclusion of the runtime session or at some other time).

The rules that can be executed by the rules engine 306 of the client application 302 may take various other forms as well.

In line with the discussion above, the logging functionality disclosed herein may involve a client application writing various types of log information and/or associated contextual information to a client device's local data storage during a runtime session of the client application. For instance, as a starting point, the client application may be configured to write a "default" set of log information and/or associated contextual information that is captured in accordance with the client application's default observability behavior (i.e., a set of log information and/or associated contextual information that is captured and reported regardless of whether any trigger event is detected) to a client device's local data storage during a runtime session of the client application. Further, if the client application's configurable rules engine has been configured to execute one or more rules related to observability behavior, the client application may be configured to write certain additional information to the client device's local data storage during a runtime session of the client application in connection with the one or more rules.

In this respect, for certain types of rules, the client application could be configured to write additional information to the client device's local data storage even prior to detecting the rule's trigger event. For example, if the configurable rules engine of the client application is configured to execute a rule specifying that one or more additional levels of log information are to be reported for a runtime session if a given trigger event is detected during the runtime session, then the client application could be configured to write the one or more additional levels of log information to the client device's local data storage throughout the entire runtime session so that the client application is capable of reporting the additional one or more levels of log information for the entire runtime session if the trigger event is detected at some point during the runtime session. As another example, if the configurable rules engine of the client application is configured to execute a rule specifying that certain contextual information preceding a given trigger event is be reported for a runtime session if the given trigger event is detected during the runtime session, then the client application could be configured to write that contextual information to the client device's local data storage throughout the entire runtime session so that the client application is capable of reporting the contextual information preceding the trigger event if the trigger event is detected at some point during the runtime session (e.g., contextual information for some window of time leading up to the trigger event). Many other examples are possible as well.

Additionally or alternatively, for other types of rules, the client application could be configured to write additional information to the client device's local data storage after detecting a rule's trigger event. For example, if the configurable rules engine of the client application is configured to execute a rule specifying that certain contextual information is to be captured at the time that a given trigger event is detected during a runtime session (and thereafter reported), such as a representation of the client application's user interface, a snapshot of the client application's thread stack and/or memory usage, or a snapshot of certain state information for the client device, then the client application may write such contextual information to the client device's local storage at the time that it detects an occurrence of the given trigger event. As another example, if the configurable rules engine of the client application is configured to execute a rule specifying that certain additional log information and/or contextual information is to be captured for the remainder of a runtime session if a given trigger event is detected (and thereafter reported), then the client application may write such additional log information and/or contextual information to the client device's local storage from the time that it detects an occurrence of the given trigger event until the end of the runtime session. Many other examples are possible as well.

In accordance with the present disclosure, any of various storage architectures may be utilized to store log information and/or associated contextual information for a runtime session of the client application within a client device's local storage.

According to one possible implementation, a client application may be configured to (i) write log information and/or associated contextual information that is captured in accordance with the client application's default observability behavior to a first set of one or more storage structures within a client device's local storage and (ii) write any additional information that is captured in accordance with one or more rules being executed by the client application's configurable rules engine to a second set of one or more storage structures within the client device's local storage. In this implementation, the client application may then be configured such that, when reporting log information and/or associated contextual information for a runtime session to the back-end platform 104, the client application (i) may always read from the first set of one or more storage structures within the client device's local storage and (ii) may additionally read from the second set of one or more storage structures within the client device's local storage if a rule specifying the reporting of additional information was satisfied during the runtime session.

To illustrate with an example, consider a scenario where a client application is programmed with a default logging level of INFO and has also been configured with a rule specifying that a DEBUG-level of log information is to be reported for a runtime session if a given trigger event is detected, as described in FIG. 3B. According to this implementation, the client application may be configured to (i) write INFO-, WARN-, ERROR-, and FATAL-levels of log information for a runtime session to a first storage structure within the client device's local storage that is to be read by default when reporting log information for the runtime session and (ii) write DEBUG-level of log information for a runtime session to a second storage structure within the client device's local storage that is only to be read when reporting log information for the runtime session if the given trigger event was detected during the runtime session.

According to another possible implementation, a client application may be configured to write log information and/or associated contextual information that is captured in accordance with the client application's default observability behavior as well as any additional information that is captured in accordance with one or more rules being executed by the client application's configurable rules engine to a common set of one or more storage structures that stores such information together. In this implementation, the client application may then be configured such that, when reporting log information and/or associated contextual information to the back-end platform 104, the client application may (i) read from the common set of one or more storage structures within the client device's local storage and then (ii) selectively determine which of the information in the common set of one or more storage structures to report for the runtime session based on which rules (if any) were satisfied during the runtime session.

To illustrate with an example, again consider a scenario where a client application is programmed with a default logging level of INFO and has also been configured with a rule specifying that a DEBUG-level of log information is to be reported for a runtime session if a given trigger event is detected. According to this implementation, the client application may be configured to write DEBUG-, INFO-, WARN-, ERROR-, and FATAL-levels of log information for a runtime session to a common storage structure within the client device's local storage, and then when reporting log information for the runtime session, the client application may (i) select the INFO-, WARN-, ERROR-, and FATAL-levels of log information for reporting by default and (ii) determine whether or not to additionally select the DEBUG-level of log information for reporting depending on whether or not the rule was satisfied during the runtime session.

The storage architecture that is utilized to store log information and/or associated contextual information for a runtime session of the client application within a client device's local storage may take other forms as well, including but not limited to the possibility that the client application could utilize an additional set of one or more storage structures to store log information and/or contextual information that has been reported to back-end platform 104. In such an implementation, the client application may be configured to transfer the reported log information and/or contextual information from the set of one or more storage structures where it was originally written to this additional set of one or more storage structures after the log information and/or contextual information has been transmitted to the back-end platform 104, where it may then be stored for some additional period of time so as to make the log information and/or contextual information available for re-transmission to the back-end platform 104 if necessary (e.g., due to a network failure or the like).

Further, the storage architecture that is utilized to store log information and/or associated contextual information for a runtime session of the client application within a client device's local storage may include storage structures having any of various forms. For instance, as one possibility, the storage architecture may include one or more volatile storage structures that are allocated within the random access memory (RAM) of the client device, such as one or more RAM-based buffers and/or RAM-based linked lists, among other possible types of volatile storage structures. As another possibility, the storage architecture may include one or more non-volatile storage structures that are allocated within the disk storage of the client device (e.g., the client device's flash disk), such as one or more disk-based buffers, disk-based databases, disk-based file stores, and/or disk-based object stores, among other possible types of non-volatile storage structures. As yet possibility, the storage architecture may include one or more hybrid storage structures that each comprise a combination of volatile and non-volatile storage structures, such as a hybrid buffer structure comprising a RAM-based buffer that is combined together with a disk-based buffer. Other forms of storage structures are possible as well.

In one particular implementation, each storage structure that is utilized to store log information and/or associated contextual information for a runtime session of the client application within a client device's local storage may take the form of a ring buffer, such as a RAM-based ring buffer, a disk-based ring buffer, or a hybrid ring buffer comprising a RAM-based ring buffer that is flushed to a disk-based ring buffer. Such a ring buffer generally comprises a fixed-size allocation of storage space within RAM and/or disk that behaves as though the storage space is continuous and circular in nature (i.e., the end of the ring buffer is connected to the beginning of the ring buffer), so that when the ring buffer is full, writing new data to the ring buffer causes the oldest data in the ring buffer to be overwritten. Additionally, in order to facilitate the logging functionality disclosed herein, such a ring buffer will preferable have certain other characteristics as well.

For instance, as one such characteristic, a ring buffer that is utilized to store log information and/or associated contextual information for a runtime session of the client application may preserve the time sequence of the stored data records such that the data records are stored in the same order that they were captured. As another such characteristic, a ring buffer that is utilized to store log information and/or associated contextual information for a runtime session of the client application may support multiple producers, so that multiple different application threads can concurrently write data records to the ring buffer. As yet another such characteristic, a ring buffer that is utilized to store log information and/or associated contextual information for a runtime session of the client application may support storage of variable-sized data records, which accounts for the fact that the data records containing the log information and/or associated contextual information may vary in size from one data record to another.

To achieve these characteristics, four indexes may be utilized to manage the write/read functionality of the ring buffer: (1) a "next_write_start" index that indicates where the next write will start (empty or overwrite), (2) a "committed_write_start" index that indicates the last committed write, which may trail the "next_write_start" index by multiple records due to out of order commits, (3) a "last_write_end_before_wrap" index that indicates the end of the last write prior to wrapping, which is used to compute the available space at the end of the ring buffer, and (4) a "next_read_start" index that indicates the next record available for reading, which may either trail or be equal to the "committed_write_start" index and may be pushed forward if the "next_write_start" index is advanced beyond the "next read start" index (e.g., during an overwrite).

Some illustrations of how these four indexes may be utilized to manage the write/read functionality of a ring buffer are shown in FIGS. 4-6. Beginning with FIG. 4A, an example ring buffer 400 includes a number of storage addresses for storing log information or contextual information for a runtime session of the client application, such as storage addresses 402, 404, 406, 408, and 410. To store data to the ring buffer 400, producers first reserve one of the storage addresses to write respective data to, after which the data is committed to the respective storage address. In the example shown in FIG. 4A, the commits to the storage addresses are out of order. As shown, the storage address 402 is reserved, indicating that a producer intends to write data to the storage address 402. At some point in time after the storage address 402 has been reserved, a producer (the same one or another one) may reserve and then commit data to the storage address 404. Additionally, a producer (the same or yet another one) may also reserve and then commit data to the storage address 406. As shown, these activities may result in the "next_write_start" index pointing to the storage address 408, indicating where a following write operation (e.g., reserve and commit) is to occur.

However, because the data to be written to the storage address 402 has not yet been committed, the commits are out-of-order. To preserve the ability to read the data of all storage addresses in an out-of-order commit scenario, the ring buffer 400 may not be readable until the out-of-order commit scenario is resolved. FIG. 4B includes an example 450 of the ring buffer to show how this issue might be resolved. In the example 450, the storage address 402 has now been committed. As such, the commits to the storage address 402, 404, and 406 are all complete, and the data stored therein may be read. As none of the storage addresses have been read from yet, the "next_read_start" index may point to the first storage address, the storage address 402, as the storage address that is to be read from next. The "committed_write_start" index may point to the storage address 406, as the storage address 306 may be the most recent storage address to be written to (e.g., based on the timing of the reservation of the storage address). Further, the "next_write_start" index may point to the storage address 408, indicating that the storage address 408 is the next available storage address to be written to by a producer.

Figure 5A:
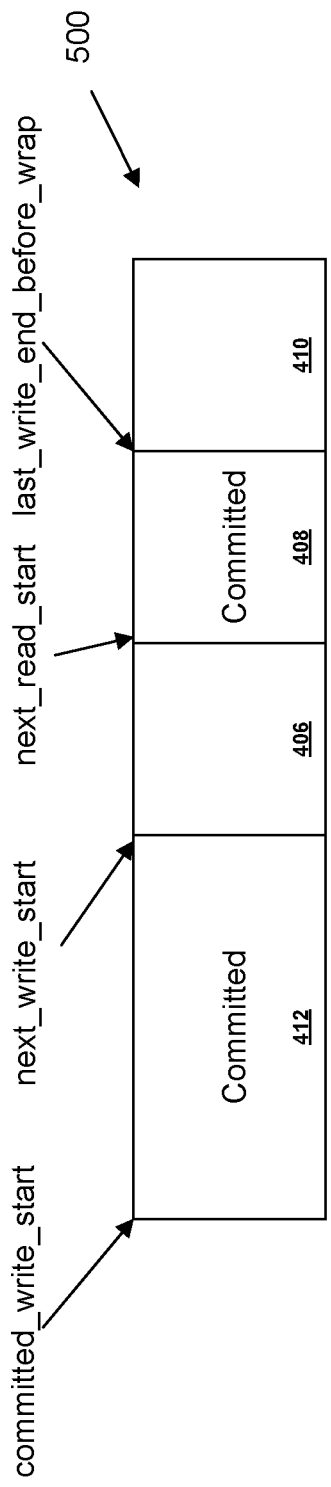
FIG. 5A is a diagram that illustrates operations of an example ring buffer, in accordance with the present disclosure.
Figure 5B:
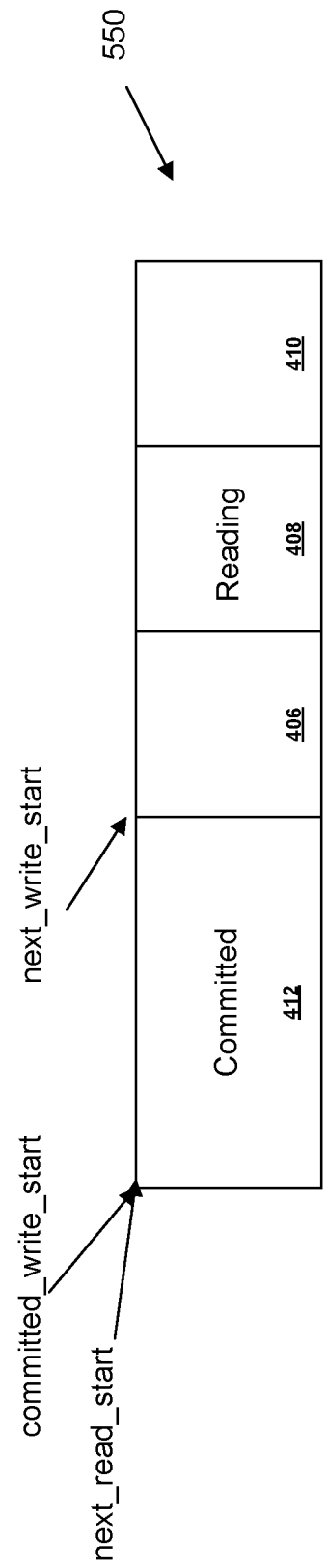
FIG. 5B is a diagram that illustrates operations of an example ring buffer, in accordance with the present disclosure.

Next, FIGS. 5A-5B show an example of wrapping features of the ring buffer 400. Turning first to FIG. 5A, an example 500 of the ring buffer 400 is shown with data committed to two storage addresses: 412 and 408. In the example 500, the storage address 408 was written to first, and the storage address 402 second, with the storage address 410 being skipped, because it was not large enough to hold the incoming data, which may be of variable size. The indices illustrate this as well, with the "committed_write_start" index pointing to the storage address 412, indicating that the storage address 412 was the last address with data committed to it, the index "next_write_start" pointing to the address 406, indicating that it is the next storage address to be written to, the index "next_read_start" pointing to the storage address 408, indicating the storage address 408 is to be read next (thus illustrating that it was written before the storage address 412, as the "committed_write_start" index trails the "next_read_start" index in the example 500), and the "last_write_end_before_wrap" index pointing to the storage address 410, or rather the position where the storage address 408 ends and the storage address 408 begins, which may be used to calculate that the memory available between the "last_write_end_before_wrap" index and the end of the ring buffer 400 is not enough to store the incoming data.

FIG. 5B shows an example 550 of the ring buffer 400 where the storage address 408 is now being read from in accordance with the indices that were shown in FIG. 5A. Specifically, as the "next_read_start" index was pointing to the storage address 408 in FIG. 5A, the FIG. 5B illustrates the reading operation taking place. When that happens, the "next_read_start" index jumps to the next storage address holding committed data, here the storage address 412.

Next, FIGS. 6A-6B show an example of overwriting features of the ring buffer 400. Turning first to FIG. 6A, an example 600 of the ring buffer 400 is shown with data committed to the storage addresses 402, 404, 406, 408, and 410. The indices indicate that the storage address 410 was last committed with data (e.g., as evidenced by the "commited_write_start" index), that there is not enough room after the storage address 410 to store incoming data (e.g., as evidenced by the "last_write_end_before_wrap" index), that the storage address 402 is to be read from next (e.g., as evidenced by the "next_read_start" index), and that the storage address 402 is also to be written to next (e.g., as evidenced by the "next_write_start" index).

Turning now to FIG. 6B, an example 650 of the ring buffer 400 is shown where a write command follows the example 600. In such a case, the data committed to the storage addresses 402 and 404 may be overwritten, and a storage address 412 (which may include the addresses of the storage addresses 402 and 404) may be reserved. The indices illustrate this overwriting operation in more detail. Specifically, the "committed_write_start" index and the "last_write_end_before_wrap" index are unchanged from the example 600, indicating that there has not been another write operation performed. Further, both the "next_write_start" index and the "next_read_start" index have move to point to the storage address 406. As shown, in instances where the "next_read_start" index might otherwise advance in front of the "next_write_start" index, the two advance together. It should be noted that in the example 650, the storage address 406 may be read from even though the storage address 412 is only reserved, and not yet committed to. This is because even though the storage address 412 is positionally "before" the storage address 406, the data committed to the storage address 406 was written "before" data was reserved for the storage address 412. This illustrates how the circular nature of the ring buffer may operate in practice.

The structure and operation of a ring buffer that is utilized to store log information and/or associated contextual information may take various other forms as well.

Figure 7:
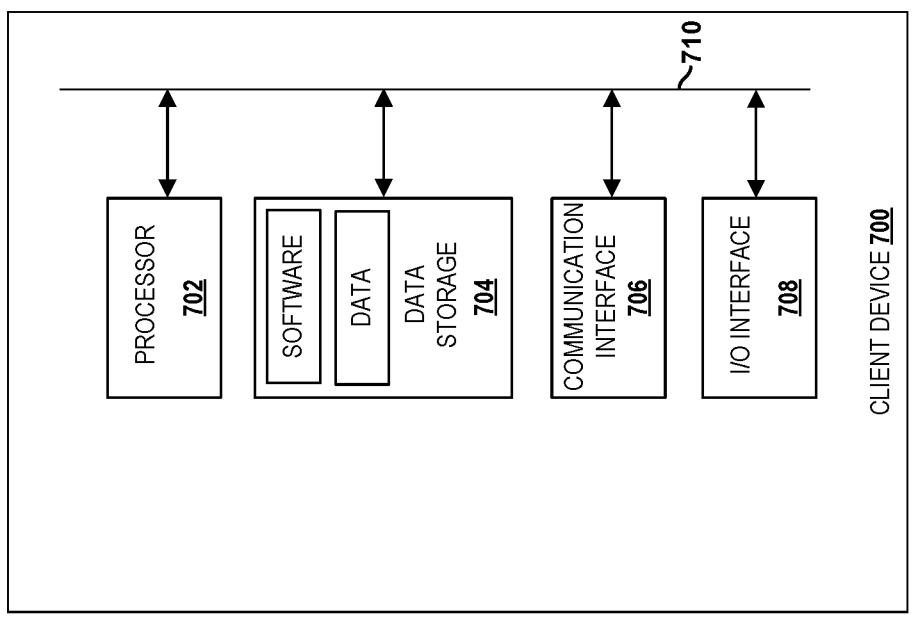
FIG. 7 is a simplified block diagram that illustrates some structural components that may be included in an example client device.

Turning now to FIG. 7, a simplified block diagram is provided to illustrate some structural components that may be included in an example client device 700, which may be configured to carry out any of the various functions disclosed herein. At a high level, client device 700 may include one or more processors 702, data storage 704, one or more communication interfaces 706, and an input/output (I/O) interface 708, all of which may be communicatively linked by a communication link 710 that may that various forms, one example of which is a system bus.

The one or more processors 702 of client device 700 may comprise one or more processor components, each of which may take the form of a general-purpose processor (e.g., a microprocessor), a special-purpose processor (e.g., an application-specific integrated circuit, a digital signal processor, a graphics processing unit, a vision processing unit, etc.), a programmable logic device (e.g., a field-programmable gate array), or a controller (e.g., a microcontroller), among other possibilities.

In turn, data storage 704 of client device 700 may comprise one or more non-transitory computer-readable mediums, each of which may take the form of a volatile medium (e.g., random-access memory, a register, a cache, a buffer, etc.) or a non-volatile medium (e.g., read-only memory, a hard-disk drive, a solid-state drive, flash memory, an optical disk, etc.), and these one or more non-transitory computer-readable mediums may be capable of storing both (i) program instructions that are executable by the one or more processors 702 of the client device 700 such that the client device 700 is configured to perform any of the various client-device functions disclosed herein (e.g., the functionality described above with reference to the end-user client device 102A and/or the software-provider client device 116A), and (ii) data related to the disclosed client-device functionality.

The one or more communication interfaces 708 of client device 700 may take the form of any one or more interfaces that facilitate wireless and/or wired communication with other computing devices or systems, including but not limited to the back-end platform 104 of FIG. 1. Each such communication interface 708 may take any of various forms, examples of which may include an Ethernet interface, a serial bus interface (e.g., Firewire, USB 3.0, etc.), a chipset and antenna adapted to facilitate any of various types of wireless communication (e.g., Wi-Fi communication, cellular communication, short-range wireless protocols, etc.), and/or any other interface that provides for wireless or wired communication. Other configurations are possible as well.

The I/O interface 708 may generally take the form of (i) one or more input interfaces that are configured to receive and/or capture information at the client device 700 and (ii) one or more output interfaces that are configured to output information from client device 700 (e.g., for presentation to a user). In this respect, the one or more input interfaces of I/O interface 708 may include or provide connectivity to input components such as a microphone, a camera, a keyboard, a mouse, a trackpad, a touchscreen, and/or a stylus, among other possibilities. In turn, the one or more output interfaces of I/O interface 708 may include or provide connectivity to output components such as a display screen and/or an audio speaker, among other possibilities.

It should be understood that the client device 700 is one example of a client device that may be used with the example embodiments described herein. Numerous other arrangements are possible and contemplated herein. For instance, in other embodiments, the client device 700 may include additional components not pictured and/or more or fewer of the pictured components.

Figure 8:
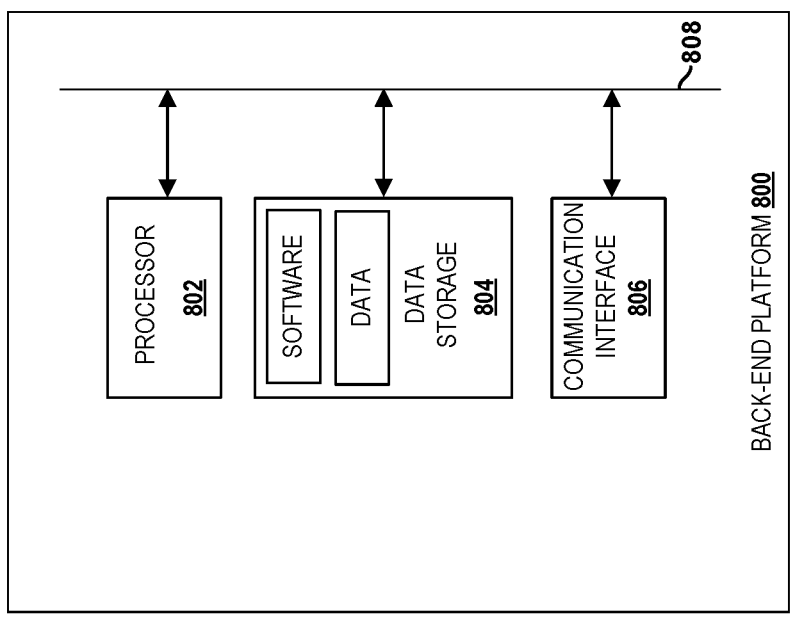
FIG. 8 is a simplified block diagram that illustrates some structural components that may be included in an example back-end platform.

Turning now to FIG. 8, a simplified block diagram is provided to illustrate some structural components that may be included in an example back-end platform 800, which may be configured to carry out any of the various functions disclosed herein. At a high level, back-end platform 800 may generally comprise any one or more computing systems that collectively include one or more processors 802, data storage 804, and one or more communication interfaces 806, all of which may be communicatively linked by a communication link 808 that may take the form of a system bus, a communication network such as a public, private, or hybrid cloud, or some other connection mechanism. Each of these components may take various forms.

The one or more processors 802 may comprise one or more processor components, each of which may take the form of a general-purpose processor (e.g., a microprocessor), a special-purpose processor (e.g., an application-specific integrated circuit, a digital signal processor, a graphics processing unit, a vision processing unit, etc.), a programmable logic device (e.g., a field-programmable gate array), or a controller (e.g., a microcontroller), among other possibilities. In line with the discussion above, it should also be understood that the one or more processors 802 could comprise processing components that are distributed across a plurality of physical computing systems connected via a network, such as a computing cluster of a public, private, or hybrid cloud.

In turn, the data storage 804 may comprise one or more non-transitory computer-readable storage mediums, each of which may take the form of a volatile medium (e.g., random-access memory, a register, a cache, a buffer, etc.) or a non-volatile medium (e.g., read-only memory, a hard-disk drive, a solid-state drive, flash memory, an optical disk, etc.), and these one or more non-transitory computer-readable mediums may be capable of storing both (i) program instructions that are executable by the one or more processors 802 such that the back-end platform 800 is configured to perform any of the various back-end platform functions disclosed herein, and (ii) data related to the disclosed back-end platform functionality. In line with the discussion above, it should also be understood that the data storage 804 may comprise computer-readable storage mediums that are distributed across a plurality of physical computing systems connected via a network, such as a storage cluster of a public, private, or hybrid cloud that operates according to technologies such as AWS for Elastic Compute Cloud, Simple Storage Service, etc.

The one or more communication interface 806 may take the form of any one or more interfaces that facilitate wireless and/or wired communication with other computing devices or systems, including but not limited to the client devices 102 and 116 of FIG. 1. Each such communication interface 808 may take any of various forms, examples of which may include an Ethernet interface, a serial bus interface (e.g., Firewire, USB 3.0, etc.), a chipset and antenna adapted to facilitate any of various types of wireless communication (e.g., Wi-Fi communication, cellular communication, short-range wireless protocols, etc.), and/or any other interface that provides for wireless or wired communication. Other configurations are possible as well.

Although not shown, the back-end platform 800 may additionally include an I/O interface that facilitates user interaction with the back-end platform 800.

It should be understood that the back-end platform 800 is one example of a back-end platform that may be used with the embodiments described herein. Numerous other arrangements are possible and contemplated herein. For instance, other back-end platforms may include additional components not pictured and/or more or less of the pictured components.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and sprit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

We claim:

1. A method implemented by a client device, the method comprising:
    installing a given instance of a client application comprising (i) program code defining a default observability behavior of the client application, wherein the default observability behavior involves carrying out a default set of observability actions during runtime sessions of the client application, and (ii) program code defining a configurable rules engine that allows for post-installation updating of the default observability behavior of the client application without installing an updated instance of the client application;
    while installed with the given instance of the client application, receiving, from a back-end platform associated with a provider of the client application, configuration data for a given rule related to observability behavior of the given instance of the client application, wherein the given rule comprises (i) a trigger event that is to cause a change in the observability behavior of the given instance of the client application and (ii) a set of one or more actions related to the observability behavior of the given instance of the client application that is to be carried out when the trigger event is detected;
    based on the received configuration data, configuring the configurable rules engine of the given instance of the client application to execute the given rule related to observability behavior of the given instance of the client application; and
    initiating a runtime session of the given instance of the client application, wherein, during the runtime session, the given instance of the client application functions to:
        begin carrying out the default set of observability actions in accordance with the default observability behavior of the given instance of the client application;

begin monitoring for the trigger event of the given rule;
while monitoring for the trigger event, detect an occurrence of the trigger event;
based on detecting the occurrence of the trigger event:
perform an evaluation of whether the default observability behavior of the given instance of the client application is to be updated based on at least one of (i) a two-way exchange of communication with the back-end platform or (ii) input from an end user of the given instance of the client application; and
based on the evaluation, determine that the default observability behavior of the given instance of the client application is to be updated and responsively update the default observability behavior of the given instance of the client application based on the set of one or more actions of the given rule.

2. The method of claim 1, wherein the given rule is defined based on user input from a user associated with the provider of the client application.

3. The method of claim 1, wherein the trigger event of the given rule comprises one of (i) recordation of a log event that satisfies a specified condition during the runtime session, (ii) detection of a specified change in a state or operation of the given instance of the client application during the runtime session, (iii) detection of a specified change in a state or operation of the client device during the runtime session, or (iv) receipt of a specified type of user input from the end user of the given instance of the client application during the runtime session.

4. The method of claim 1, wherein updating the default observability behavior of the given instance of the client application based on the set of one or more actions of the given rule comprises triggering the given instance of the client application to report additional log information for the runtime session to the back-end platform.

5. The method of claim 4, wherein updating the default observability behavior of the given instance of the client application based on the set of one or more actions of the given rule further comprises triggering the given instance of the client application to capture the additional log information for the runtime session that is to be reported to the back-end platform.

6. The method of claim 4, wherein the configurable rules engine causes the given instance of the client application to begin provisionally capturing the additional log information for the runtime session prior to detecting the occurrence of the trigger event.

7. The method of claim 6, wherein the given instance of the client application writes the provisionally-captured log information to a ring buffer within local data storage of the client device.

8. The method of claim 4, wherein the default set of observability actions comprises capturing one or more default levels of log information for the runtime session, and wherein the additional log information comprises one or more additional levels of log information.

9. The method of claim 1, wherein updating the default observability behavior of the given instance of the client application based on the set of one or more actions of the given rule comprises causing the given instance of the client application to report additional contextual information for the runtime session to the back-end platform.

10. The method of claim 9, wherein the additional contextual information comprises one of (i) state information for the given instance of the client application or (ii) state information for the client device.

11. The method of claim 1, wherein updating the default observability behavior of the given instance of the client application based on the set of one or more actions of the given rule comprises causing the given instance of the client application to initiate a live support session or an interactive debugging session with the provider of the client application.

12. A non-transitory computer-readable medium comprising program instructions stored thereon that are executable to cause a client device to perform functions comprising:
installing a given instance of a client application comprising (i) program code defining a default observability behavior of the client application, wherein the default observability behavior involves carrying out a default set of observability actions during runtime sessions of the client application, and (ii) program code defining a configurable rules engine that allows for post-installation updating of the default observability behavior of the client application without installing an updated instance of the client application;
while installed with the given instance of the client application, receiving, from a back-end platform associated with a provider of the client application, configuration data for a given rule related to observability behavior of the given instance of the client application, wherein the given rule comprises (i) a trigger event that is to cause a change in the observability behavior of the given instance of the client application and (ii) a set of one or more actions related to the observability behavior of the given instance of the client application that is to be carried out when the trigger event is detected;
based on the received configuration data, configuring the configurable rules engine of the given instance of the client application to execute the given rule related to observability behavior of the given instance of the client application; and
initiating a runtime session of the given instance of the client application, wherein, during the runtime session, the given instance of the client application functions to:
begin carrying out the default set of observability actions in accordance with the default observability behavior of the given instance of the client application;
begin monitoring for the trigger event of the given rule;
while monitoring for the trigger event, detect an occurrence of the trigger event;
based on detecting the occurrence of the trigger event:
perform an evaluation of whether the default observability behavior of the given instance of the client application is to be updated based on at least one of (i) a two-way exchange of communication with the back-end platform or (ii) input from an end user of the given instance of the client application; and
based on the evaluation, determine that the default observability behavior of the given instance of the client application is to be updated and responsively update the default observability behavior of the given instance of the client application based on the set of one or more actions of the given rule.

13. The non-transitory computer-readable medium of claim 12, wherein the given rule is defined based on user input from a user associated with the provider of the client application.

14. The non-transitory computer-readable medium of claim 12, wherein the trigger event of the given rule comprises one of (i) recordation of a log event that satisfies a specified condition during the runtime session, (ii) detection of a specified change in a state or operation of the given instance of the client application during the runtime session, (iii) detection of a specified change in a state or operation of the client device during the runtime session, or (iv) receipt of a specified type of user input from the end user of the given instance of the client application during the runtime session.

15. The non-transitory computer-readable medium of claim 12, wherein updating the default observability behavior of the given instance of the client application based on the set of one or more actions of the given rule comprises triggering the given instance of the client application to report additional log information for the runtime session to the back-end platform.

16. The non-transitory computer-readable medium of claim 15, wherein updating the default observability behavior of the given instance of the client application based on the set of one or more actions of the given rule further comprises triggering the given instance of the client application to capture the additional log information for the runtime session that is to be reported to the back-end platform.

17. The non-transitory computer-readable medium of claim 15, wherein the configurable rules engine causes the given instance of the client application to begin provisionally capturing the additional log information for the runtime session prior to detecting the occurrence of the trigger event.

18. The non-transitory computer-readable medium of claim 17, wherein the given instance of the client application writes the provisionally-captured log information to a ring buffer within local data storage of the client device.

19. The non-transitory computer-readable medium of claim 15, wherein the default set of observability actions comprises capturing one or more default levels of log information for the runtime session, and wherein the additional log information comprises one or more additional levels of log information.

20. A client device comprising:
at least one processor;
at least one non-transitory computer-readable medium; and
program instructions stored on the at least one non-transitory computer-readable medium that are executable by the at least one processor such that the client device is configured to:
install a given instance of a client application comprising (i) program code defining a default observability behavior of the client application, wherein the default observability behavior involves carrying out a default set of observability actions during runtime sessions of the client application, and (ii) program code defining a configurable rules engine that allows for post-installation updating of the default observability behavior of the client application without installing an updated instance of the client application;
while installed with the given instance of the client application, receive, from a back-end platform associated with a provider of the client application, configuration data for a given rule related to observability behavior of the given instance of the client application, wherein the given rule comprises (i) a trigger event that is to cause a change in the observability behavior of the given instance of the client application and (ii) a set of one or more actions related to the observability behavior of the given instance of the client application that is to be carried out when the trigger event is detected;
based on the received configuration data, configure the configurable rules engine of the given instance of the client application to execute the given rule related to observability behavior of the given instance of the client application; and
initiate a runtime session of the given instance of the client application, wherein, during the runtime session, the given instance of the client application functions to:
begin carrying out the default set of observability actions in accordance with the default observability behavior of the given instance of the client application;
begin monitoring for the trigger event of the given rule;
while monitoring for the trigger event, detect an occurrence of the trigger event;
based on detecting the occurrence of the trigger event:
perform an evaluation of whether the default observability behavior of the given instance of the client application is to be updated based on at least one of (i) a two-way exchange of communication with the back-end platform or (ii) input from an end user of the given instance of the client application; and
based on the evaluation, determine that the default observability behavior of the given instance of the client application is to be updated and responsively update the default observability behavior of the given instance of the client application based on the set of one or more actions of the given rule.

21. The method of claim 1, wherein the evaluation of whether the default observability behavior of the given instance of the client application is to be updated is based at least on the two-way exchange of communication with the back-end platform.

22. The method of claim 21, wherein the two-way exchange of communication comprises (i) a first communication from the client device to the back-end platform that includes an indication that the trigger event has occurred and (ii) a second communication from the back-end platform to the client device that includes an instruction to update the default observability behavior of the given instance of the client application.

23. The method of claim 1, wherein the evaluation of whether the default observability behavior of the given instance of the client application is to be updated is based at least on the input from the end user of the given instance of the client application.

* * * * *